(12) United States Patent
Qiao et al.

(10) Patent No.: US 11,134,108 B2
(45) Date of Patent: *Sep. 28, 2021

(54) DETERMINING AN ACCESS NETWORK FOR AN IMS SESSION BASED ON T-ADS INFORMATION

(71) Applicant: Ofinno, LLC, Reston, VA (US)

(72) Inventors: Weihua Qiao, Herndon, VA (US); Esmael Dinan, McLean, VA (US); Kyungmin Park, Herndon, VA (US); Peyman Talebi Fard, Sterling, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/920,162

(22) Filed: Jul. 2, 2020

(65) Prior Publication Data

US 2020/0336517 A1  Oct. 22, 2020

Related U.S. Application Data

(63) Continuation of application No. 16/357,981, filed on Mar. 19, 2019, now Pat. No. 10,708,318.

(Continued)

(51) Int. Cl.
*H04L 29/06* (2006.01)
*H04L 29/12* (2006.01)

(52) U.S. Cl.
CPC ...... *H04L 65/1069* (2013.01); *H04L 61/2007* (2013.01); *H04L 65/1016* (2013.01); *H04L 65/1073* (2013.01)

(58) Field of Classification Search
CPC ............. H04L 65/1069; H04L 65/1016; H04L 65/1073; H04L 61/2007
See application file for complete search history.

(56) References Cited

U.S. PATENT DOCUMENTS 9,363,295 B2 * 6/2016 Koshimizu ......... H04L 65/1083
9,986,525 B1 * 5/2018 Chiang ................ H04W 60/02
(Continued)

OTHER PUBLICATIONS

3GPP TS 23.218 V14.0.0 (Feb. 17, 2003); 3rd Generation Partnership Project; Technical Specification Group Core Network and Terminals; IP Multimedia (IM) session handling; IM call model; Stage 2 (Release 14).

(Continued)

*Primary Examiner* — Jonathan A Bui
(74) *Attorney, Agent, or Firm* — Kavon Nasabzadeh; Philip Smith; Willis Chang

(57) ABSTRACT

An application server receives, from a subscriber server, terminating access domain selection (T-ADS) information for an Internet protocol multimedia subsystem (IMS) session of a wireless device. The T-ADS information comprises a first wireless device Internet protocol (IP) address and a first network name of a first radio access technology (RAT) for the IMS session. The T-ADS information comprises a second wireless device IP address and a second network name of a second RAT. A determination is made of an access network for the IMS session based on the T-ADS information. The access network is one of the first RAT or the second RAT. An IMS message to setup the IMS session over the access network is sent to the wireless device.

20 Claims, 25 Drawing Sheets

Related U.S. Application Data

(60) Provisional application No. 62/646,232, filed on Mar. 21, 2018.

(56) References Cited

U.S. PATENT DOCUMENTS

| | | | | |
|---|---|---|---|---|
| 10,383,163 | B2* | 8/2019 | Osterlund | H04W 76/12 |
| 2016/0226922 | A1* | 8/2016 | Russell | H04L 65/1069 |
| 2018/0027458 | A1* | 1/2018 | Mohan | H04W 48/08 370/331 |
| 2018/0199395 | A1* | 7/2018 | Huang-Fu | H04L 65/1066 |
| 2019/0174003 | A1* | 6/2019 | Chandramouli | H04L 65/1016 |
| 2019/0190775 | A1* | 6/2019 | Buckley | H04L 67/28 |
| 2019/0281506 | A1* | 9/2019 | Chiang | H04W 12/71 |
| 2019/0281647 | A1* | 9/2019 | Chiang | H04W 36/0022 |
| 2021/0036919 | A1* | 2/2021 | Foti | H04L 41/0806 |

OTHER PUBLICATIONS

3GPP TS 23.221 V15.0.0 (Sep. 2017); 3rd Generation Partnership Project; Technical Specification Group Services and System Aspects; Architectural requirements (Release 15).

3GPP TS 23.292 V14.2.0 (Mar. 2017); 3rd Generation Partnership Project; Technical Specification Group Services and System Aspects; IP Multimedia Subsystem (IMS) centralized services; Stage 2 (Release 14).

3GPP TA 23.401 V15.0.0 (Jun. 2017); 3rd Generation Partnership Project; Technical Specification Group Services and System Aspects; General Packet Radio Service (GPRS) enhancements for Evolved Universal Terrestrial Radio Access Network (E-UTRAN) access (Release 15).

3GPP TS 23.501 V15.0.0 (Dec. 2017); 3rd Generation Partnership Project; Technical Specification Group Services and System Aspects; System Architecture for the 5G System; Stage 2 (Release 15).

3GPP TS 24.228 V5.15.0 (Sep. 2006); 3rd Generation Partnership Project; Technical Specification Group Core Network and Terminals; Signalling flows for the IP multimedia call control based on Session Initiation Protocol (SIP) and Session Description Protocol (SDP); Stage 3 (Release 5).

3GPP TS 24.229 V15.0 (Dec. 2017); 3rd Generation Partnership Project; Technical Specification Group Core Network and Terminals; IP multimedia call control protocol based on Session Initiation Protocol (SIP) and Session Description Protocol (SDP); Stage 3 (Release 15).

3GPP TS 24.292 V15.0.0 (Dec. 2017); 3rd Generation Partnership Project; Technical Specification Group Core Network and Terminals; IP Multimedia (IM) Core Network (CN) subsystem Centralized Services (ICS); Stage 3 (Release 15).

SA WG2 Meeting #121 S2-173037 May 15-19, 2017, Hangzhou, China Source: China Mobile Title: Discussion on requirement on dual registration for supporting IMS voice continuity Document for: Discussion and approval Agenda Item: 6.5.9 Work Item / Release: 5GS_ph1/Rel 15.

SA WG2 Meeting #121 S2-173203 May 15-19, 2017 Hangzhou, China Source: Samsung Title: 5GC-EPC Interworking for dual registration UE Document for: Approval Agenda Item: 6.5.9 Work Item / Release: 5G_ph1 / Rel-15 TS23.501.

3GPP TSG SA WG2 Meeting #121 S2-173523 May 15-19, 2017, Hangzhou, P.R. China (revision of S2-17xxxx) Source: Intel Title: 23.501: Selective PDU Session mobility for Dual registration 5GC-EPC interworking Document for: Approval Agenda Item: 6.5.9 Work Item / Release: 5G-Ph1 / Rel-15.

SA WG2 Meeting #121 S2-173545 May 15-19, 2017, Hangzhou, China Source: KDDI Title: Update Editor's note of Dual registration mode for specific services in TS 23.501 Document for: Approval Agenda Item: 6.5.9 Work Item / Release: 5G_ph1/ Rel-15.

SA WG2 Meeting #124 S2-178466 Nov. 27-Dec. 1, 2017, Reno, USA (revision of S2-17xxxx) Source: NTT DOCOMO Title: T-ADS with dual registered UE Document for: Approval Agenda Item: 6.5.8 Work Item / Release: 5GS_Ph1 / Rel-15.

SA WG2 Meeting #125 S2-180746 Jan. 22-26, 2018, Gothenburg, Sweden (revision of S2-18xxx) Source: NTT DOCOMO Title: T-ADS with dual registered UE, discussion Document for: Discussion Agenda Item: 6.5.8 Work Item / Release: 5G Ph1 / Rel-15.

3GPP TSG-SA WG2 Meeting #125 S2-180747; Gothenburg, Sweden; Jan. 22-26, 2018.

SA WG2 Meeting #126 S2-181876; Feb. 26-Mar. 2, 2018, Montreal, Canada (was S2-18xxxx).

SA WG2 Meeting #126 S2-182262; Feb. 26-Mar. 2, 2018, Montreal, Canada (revision of S2-18xxxx).

3GPP TSG-SA WG2 Meeting #126 S2-182383 ;Montreal, Canada, Feb. 26-Mar. 2, 2018.

3GPP TSG-SA WG2 Meeting #126 S2-182384; Montreal, Canada, Feb. 26-Mar. 2, 2018.

3GPP TSG-CT WG1 Meeting #106 C1-174339; Kochi (India), Oct. 23-27, 2017.

* cited by examiner

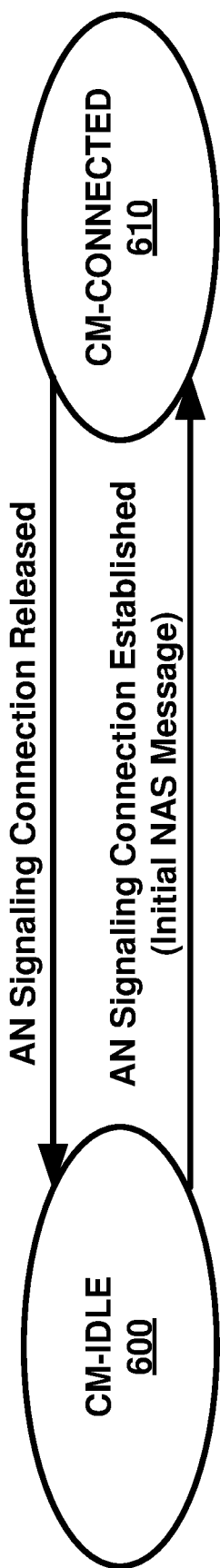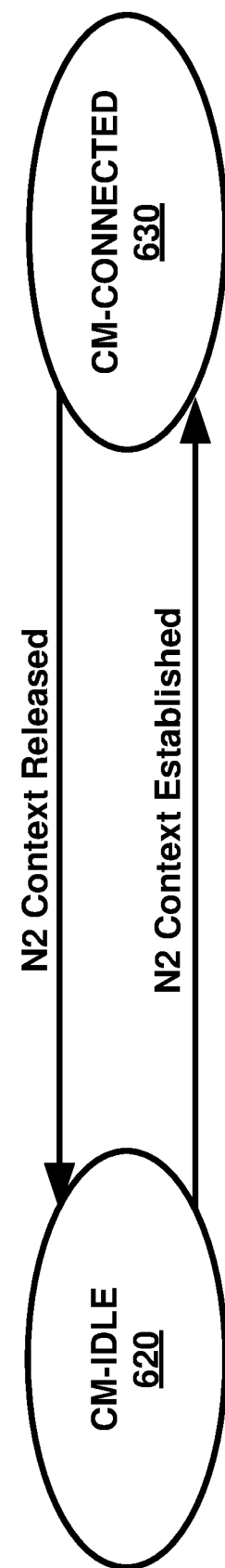

Send, by the subscriber server to a MME, a message indicating a 2nd query for a 1st domain information
2010
Receive, by the subscriber server from the MME, the 1st network name
2020
Send, by the subscriber server to a MME, a message indicating a 2nd query for a 1st domain information
2030
Receive, by the subscriber server from the MME, the 1st wireless device IP address
2040
FIG. 20

Send, by an AS to a subscriber server, a request message indicating a 1st query for T-ADS information for an IP IMS session of a wireless device
2210

Receive, by the AS from the subscriber server, the T-ADS information comprising: a 1st network name of a 1st RAT for the IMS session; and a 2nd network name of a 2nd RAT
2220

Determine, by the AS, an access network for the IMS session based on the 1st network name and the 2nd network name, where the access network is one of the 1st RAT or the 2nd RAT
2230

Send, by the AS to the wireless device, a message to setup the IMS session over the access network
2240

FIG. 22

Receive, by a subscriber server from an AS, a message indicating a 1st query for T-ADS information for an IP IMS session of a wireless device
2310

Send, by the subscriber server to an AMF and in response to receiving the message, a 1st request message for a 1st T-ADS information
2320

Receive, by the subscriber server from the AMF, a 1st response message comprising the 1st T-ADS information, where the 1st T-ADS information comprises a 1st wireless device IP address and a 1st network name of a 1st RAT for the IMS session
2330

Send, by the subscriber server to a MME and in response to receiving the message, a 2nd request message for a 2nd T-ADS information
2340

Receive, by the subscriber server from the MME, a 2nd response message comprising the 2nd T-ADS information, where the 2nd T-ADS information comprises a 2nd wireless device IP address and a 2nd network name of a 2nd RAT for the IMS session
2350

Send, by the subscriber server to the AS, the 1st T-ADS information and the 2nd T-ADS information for selection of one of a 1st access network and a 2nd access network for the IMS session
2360

FIG. 23

```
┌─────────────────────────────────────────────────────┐
│ Receive, by a subscriber server from an AS, a message indicating │
│   a 1st query for T-ADS information for an IP IMS session of a   │
│                      wireless device                             │
│                           2410                                   │
└─────────────────────────────────────────────────────┘
                            │
                            ▼
┌─────────────────────────────────────────────────────┐
│  Send, by the subscriber server to an AMF and in response to     │
│  receiving the message, a 1st request message for a 1st T-ADS    │
│                        information                               │
│                           2420                                   │
└─────────────────────────────────────────────────────┘
                            │
                            ▼
┌─────────────────────────────────────────────────────┐
│  Receive, by the subscriber server from the AMF, a 1st response  │
│  message comprising the 1st T-ADS information, where the 1st T-  │
│  ADS information comprises a 1st wireless device IP address and a│
│       1st network name of a 1st RAT for the IMS session          │
│                           2430                                   │
└─────────────────────────────────────────────────────┘
                            │
                            ▼
┌─────────────────────────────────────────────────────┐
│   Send, by the subscriber server to the AS, the 1st T-ADS        │
│   information for selection of an access network for the IMS     │
│                          sessionk                                │
│                           2440                                   │
└─────────────────────────────────────────────────────┘
```

FIG. 24

DETERMINING AN ACCESS NETWORK FOR AN IMS SESSION BASED ON T-ADS INFORMATION

CROSS-REFERENCE TO RELATED APPLICATIONS

This application is a continuation of U.S. patent application Ser. No. 16/357,981, filed Mar. 19, 2019, which claims the benefit of U.S. Provisional Application No. 62/646,232, filed Mar. 21, 2018, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 6A and FIG. 6B depict two connection management state models in UE 100 and AMF 155 as per an aspect of embodiments of the present disclosure.

FIG. 20 is an example flow diagram as per an aspect of an embodiment of the present disclosure.

FIG. 22 is an example flow diagram as per an aspect of an embodiment of the present disclosure.

FIG. 23 is an example flow diagram as per an aspect of an embodiment of the present disclosure.

FIG. 24 is an example flow diagram as per an aspect of an embodiment of the present disclosure.

DETAILED DESCRIPTION OF EMBODIMENTS

Figure 1:
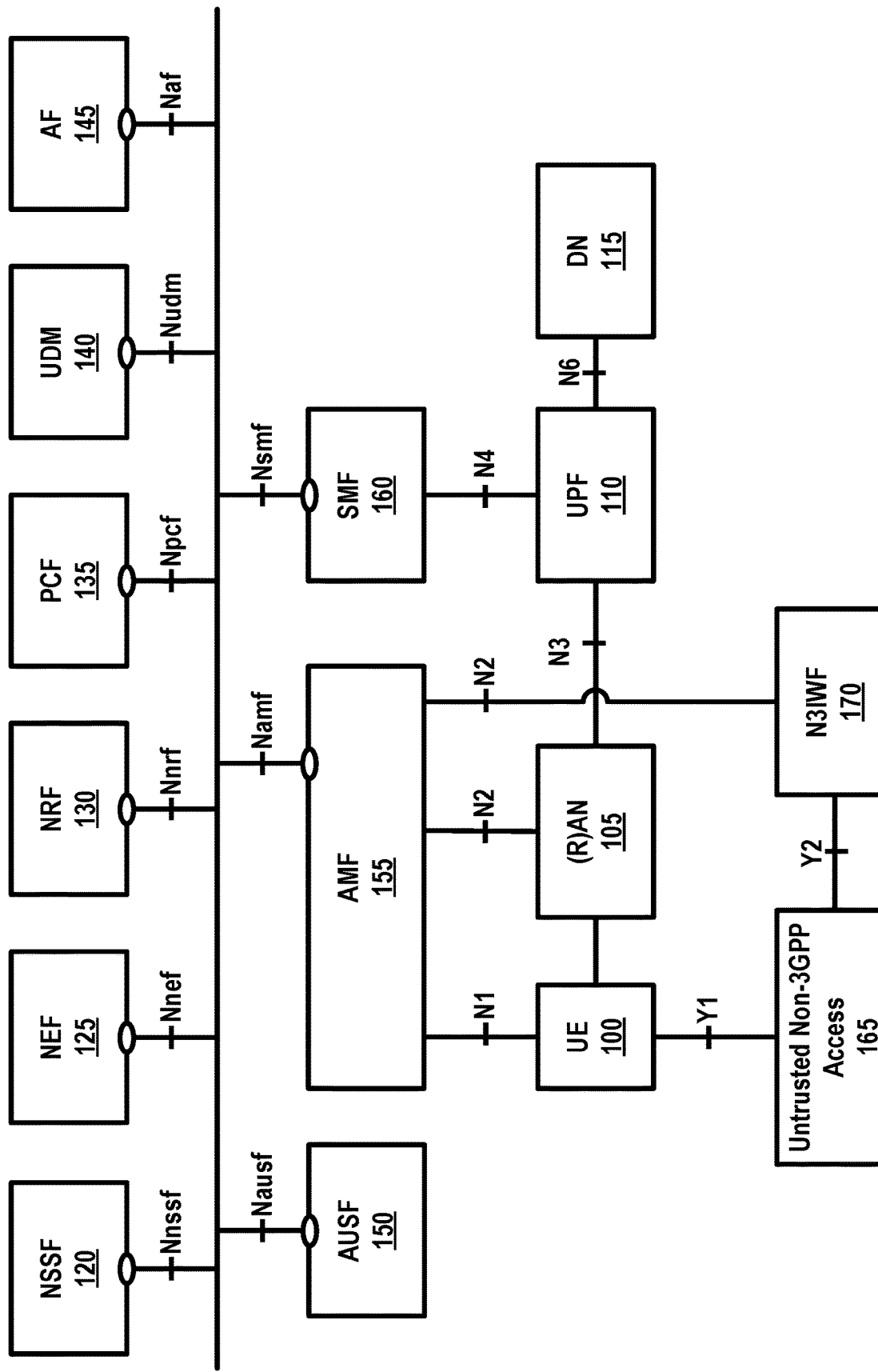
FIG. 1 is a diagram of an example 5G system architecture as per an aspect of an embodiment of the present disclosure.

Example embodiments enable enhanced features and functionalities, such as for example, Terminating Access Domain Selection (T-ADS) for dual registered wireless devices.

The following acronyms are used throughout the present disclosure:
- 5G 5th generation mobile networks
- 5GC 5G Core Network
- 5GS 5G System
- 5G-AN 5G Access Network
- 5QI 5G QoS Indicator
- ADS Access Domain Selection
- AF Application Function
- AMBR Aggregate Maximum Bit Rate
- AMF Access and Mobility Management Function
- AN Access Network
- APN Access Point Name
- ARP Allocation and Retention Priority
- CCNF Common Control Network Functions
- CN Core Network
- CP Control Plane
- CS Circuit Switched
- CSCF Call Session Control Function
- DPI Deep Packet Inspection
- DL Downlink
- DN Data Network
- DN-AAA Data Network Authentication Authorization and Accounting
- DNN Data Network Name
- gNB NR NodeB
- GW Gateway
- HAF Home AF
- HNEF Home Network Exposure Function
- HPCF Home Policy Control Function
- HSS Home Subscriber Server
- ICS IMS Centralized Services
- IETF Internet Engineering Task Force
- IMS IP Multimedia Core Network Subsystem
- IP Internet Protocol
- IP-CAN IP Connectivity Access Network
- L2 Layer 2 (data link layer)
- L3 Layer 3 (network layer)
- LADN Local Area Data Network
- MICO Mobile Initiated Connection Only
- N3IWF Non-3GPP InterWorking Function
- NAI Network Access Identifier
- NAS Non Access Stratum
- NEF Network Exposure Function
- NF Network Function
- NR New Radio
- NG-RAN NR Radio Access Network
- NRF Network Repository Function
- NSI Network Slice Instance
- NSSAI Network Slice Selection Assistance Information
- NSSF Network Slice Selection Function
- PCC Policy and Charging Control PCF Policy Control Function
PDCP Packet Data Convergence Protocol
PDN Packet Data Network
PDU Packet Data Unit
PEI Permanent Equipment Identifier
PLMN Public Land Mobile Network
RAN Radio Access Network
RB Radio Bearer
RFC Request For Comments
RLC Radio Link Control
RRC Radio Resource Control
RM Registration Management
SBA Service Based Architecture
SCC AS Service Centralization and Continuity Application Server
SDU Service Data Unit
SMF Session Management Function
SMSF SMS Function
SN Sequence Number
S-NSSAI Single Network Slice Selection Assistance information
SRB Signaling Radio Bearer carrying control plane data
SUPI Subscriber Permanent Identifier
TDF Traffic Detection Function
TA Tracking Area
T-ADS Terminating ADS
TAI Tracking Area Identity
TCP Transmission Control Protocol
UDM Unified Data Management
UDP User Datagram Protocol
UE User Equipment
UL Uplink
UL CL Uplink Classifier
UPF User Plane Function
VPCF Visited PCF Throughout the present disclosure, UE, wireless device, and mobile device are used interchangeably. Throughout the present disclosure, base station, evolved Node B (eNB or eNodeB) are used interchangeably. Throughout the present disclosure, base station, (Radio) Access Network ((R)AN), Next Generation Radio Access Network (NG-RAN), New radio Node B (gNB), Next Generation eNodeB (ng-eNBs) are used interchangeably.

Figure 2:
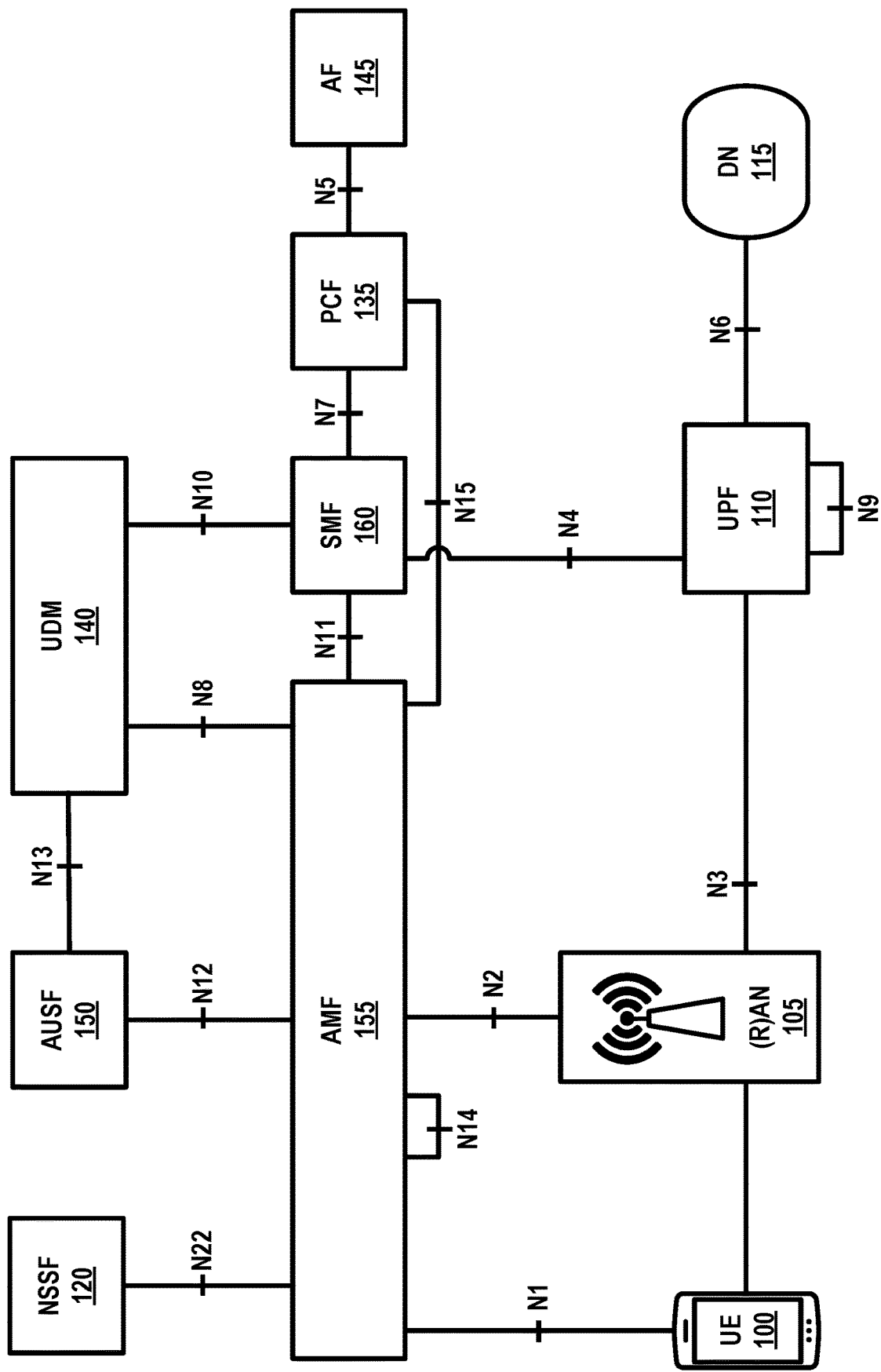
FIG. 2 is a diagram of an example 5G System architecture as per an aspect of an embodiment of the present disclosure.

Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
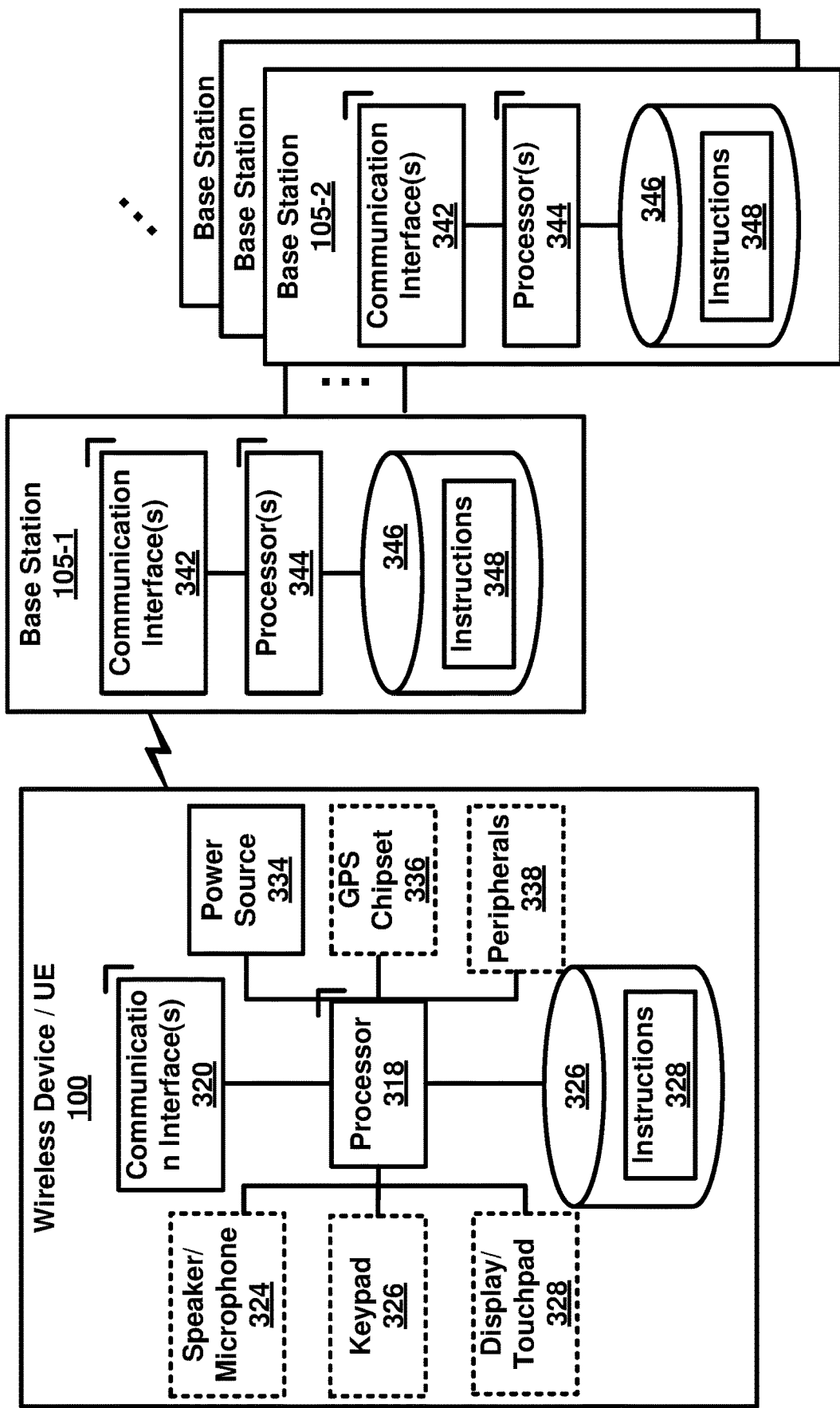
FIG. 3 is a system diagram of an example wireless device and a network node in a 5G system as per an aspect of an embodiment of the present disclosure.
Figure 4:
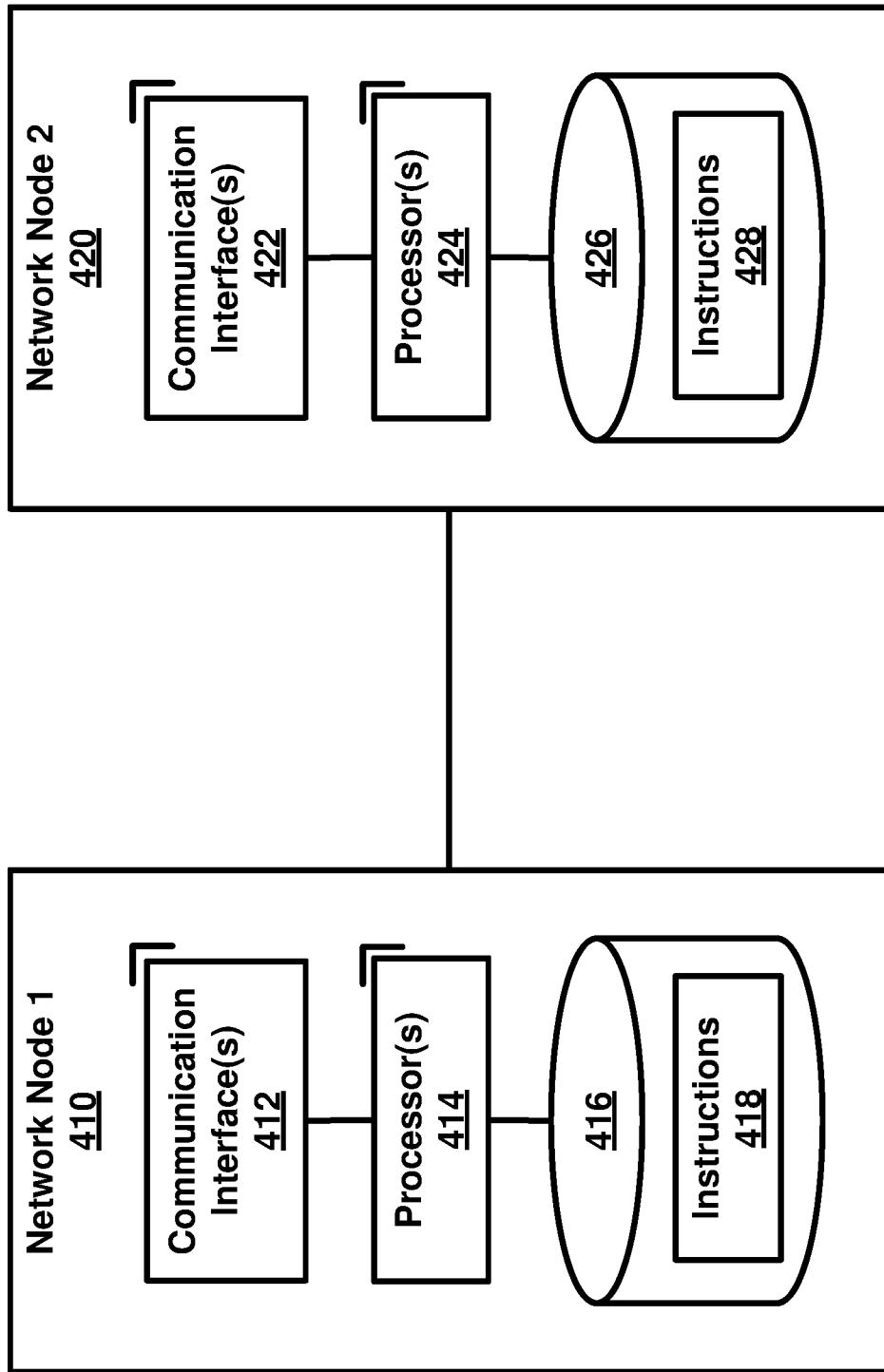
FIG. 4 is a system diagram of an example wireless device as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, a network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

Figure 5A:
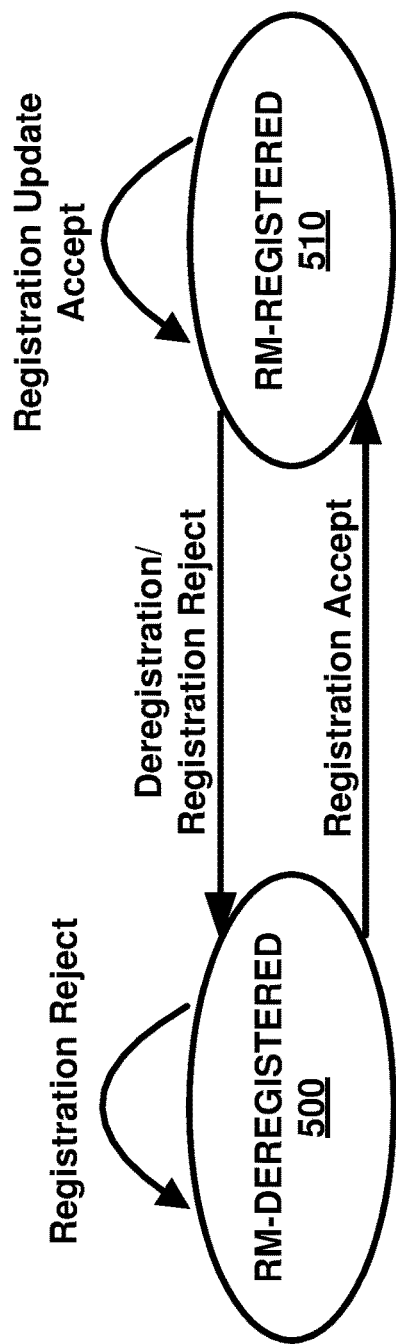
FIG. 5A and FIG. 5B depict two registration management state models in UE 100 and AMF 155 as per an aspect of embodiments of the present disclosure.
Figure 5B:
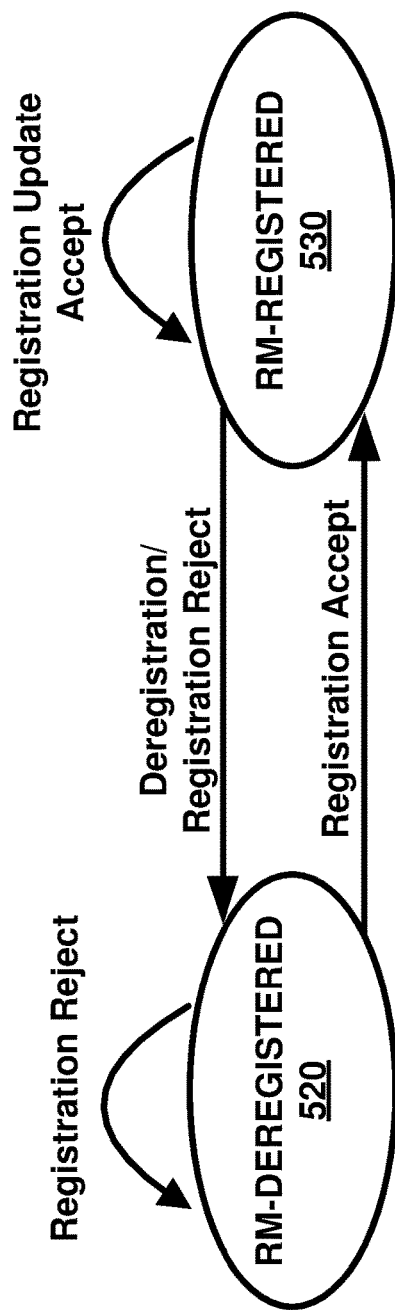

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
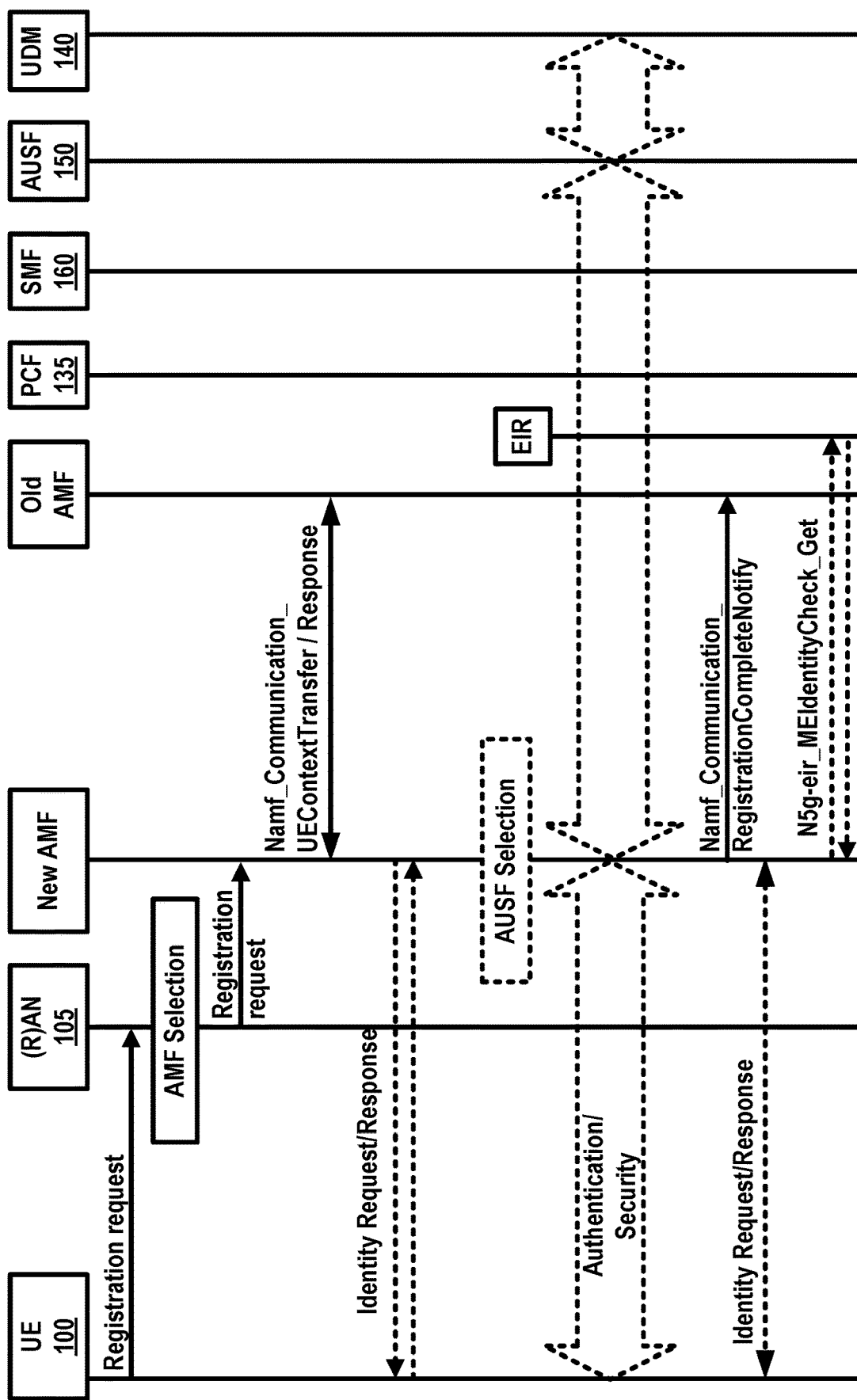
FIG. 8 is an example call flow as per an aspect of an embodiment of the present disclosure.
Figure 9:
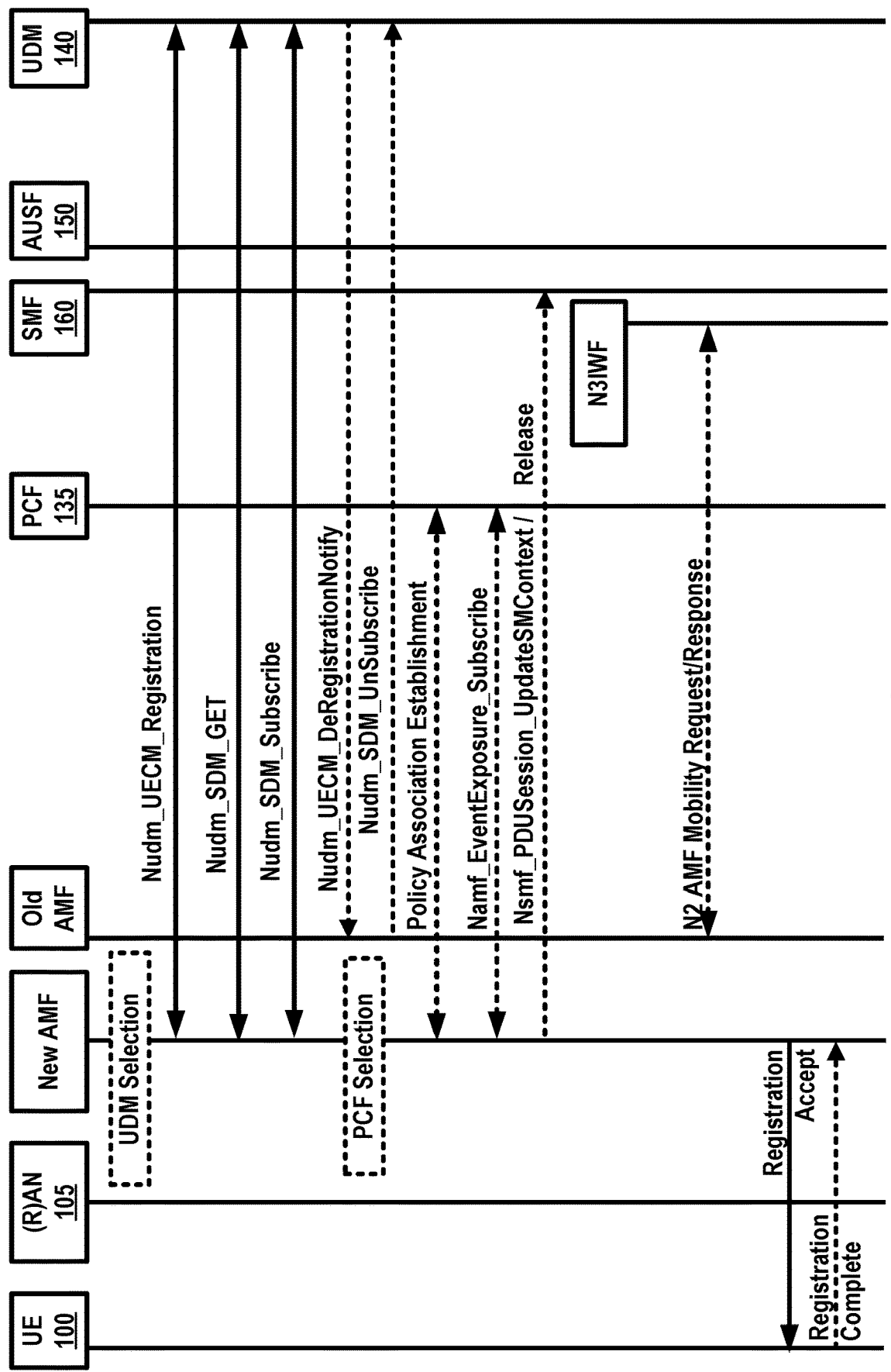
FIG. 9 is an example call flow as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
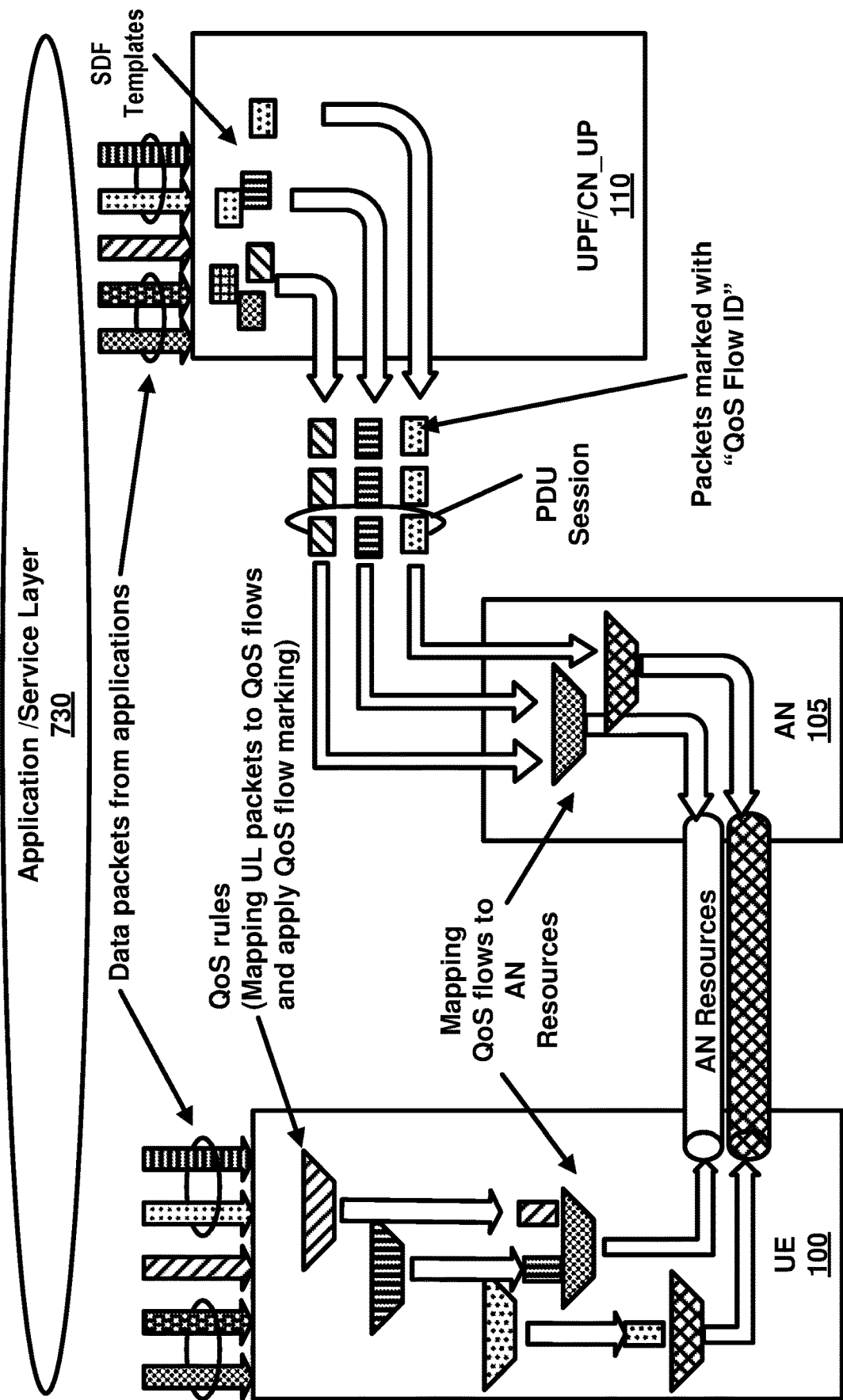
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEf 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/ or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message.

For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection.

In an example, the (R)AN 105 may send to the new AMF 155 an N2 message (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request). In an example, if the UE's 5G-GUTI was included in the registration request and the serving AMF 155 has changed since last registration procedure, the new AMF 155 may invoke the Namf_Communication_UEContextTransfer service operation on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure may be initiated by the AMF 155 sending an identity request message to the UE 100 requesting the SUCI.

In an example, the UE 100 may respond with an identity response message including the SUCI. The UE 100 may derive the SUCI by using the provisioned public key of the HPLMN.

In an example, the AMF 155 may decide to initiate UE 100 authentication by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration, the AMF 155 may skip the authentication and security setup, or the AMF 155 may accept that the authentication may fail and may continue the registration procedure.

In an example, the authentication may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(*s*) to locally release the UE's SM context by invoking the Nsmf_PDUSession_ReleaseSMContext service operation.

In an example, the new AMF 155 may send to the UE 100 an identity request/response (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check by invoking the N5g-eir_EquipmentIdentity-Check_Get service operation.

In an example, the new AMF 155, based on the SUPI, may select a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM Registration and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get. The UDM 140 may retrieve this information from UDR by Nudr_UDM_Query(access and mobility subscription data). After a successful response is received, the AMF 155 may subscribe to be notified using Nudm_SDM_Subscribe when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select a PCF 135.

In an example, the new AMF 155 may perform a policy association establishment during registration procedure. If the new AMF 155 contacts the PCF 135 identified by the (V-)PCF ID received during inter-AMF 155 mobility, the new AMF 155 may include the PCF-ID in the Npcf_AMPolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation for UE 100 event subscription.

In an example, the AMF 155 may send to the SMF 160 an Nsmf_PDUSession_UpdateSMContext. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(*s*) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155155 may send to a N3IWF an N2 AMF 155 mobility request. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response.

In an example, the new AMF 155 may send to the UE 100 a registration accept (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete message. In an example, the UE 100 may send the registration complete message to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
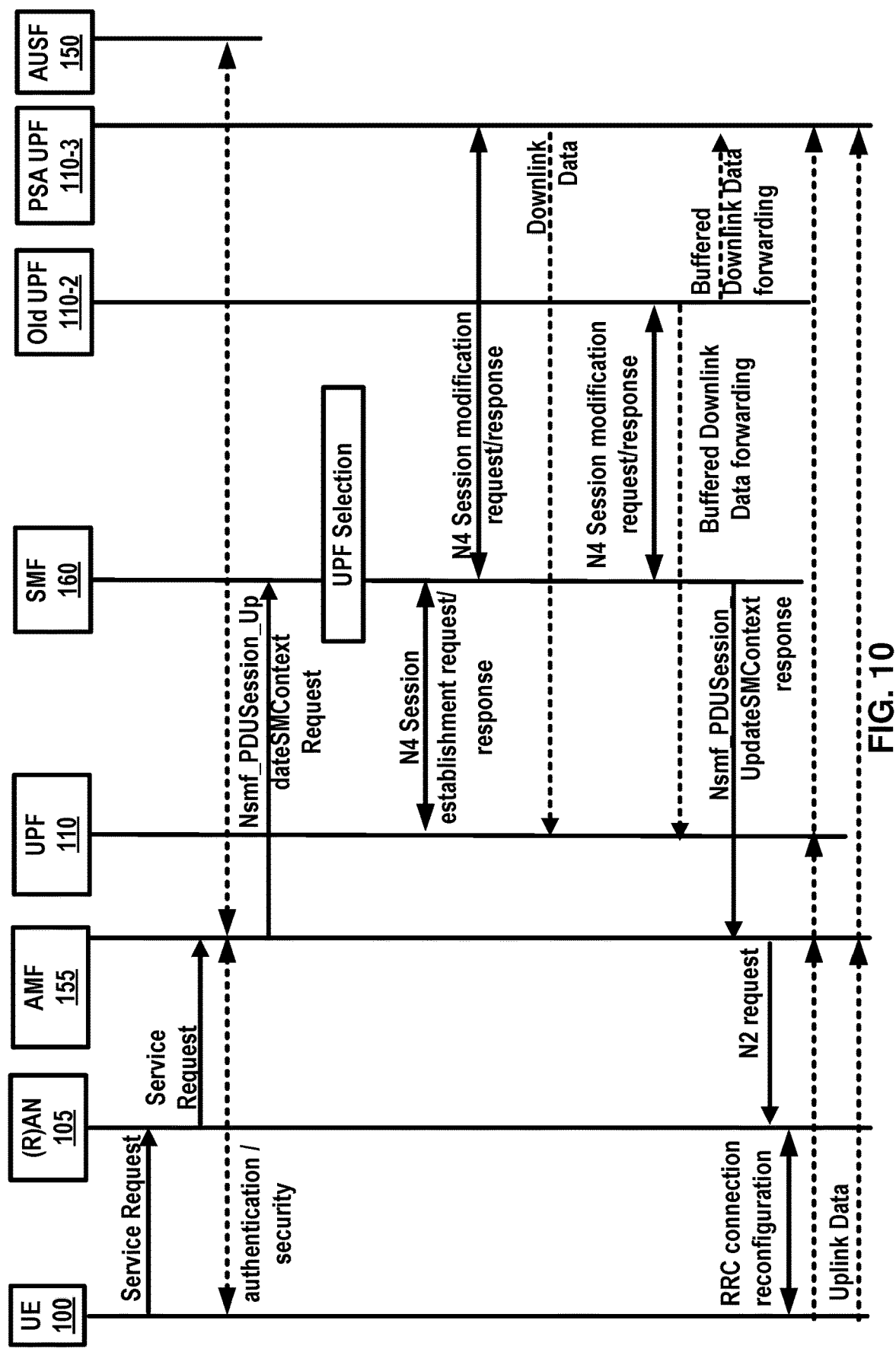
FIG. 10 is an example call flow as per an aspect of an embodiment of the present disclosure.
Figure 11:
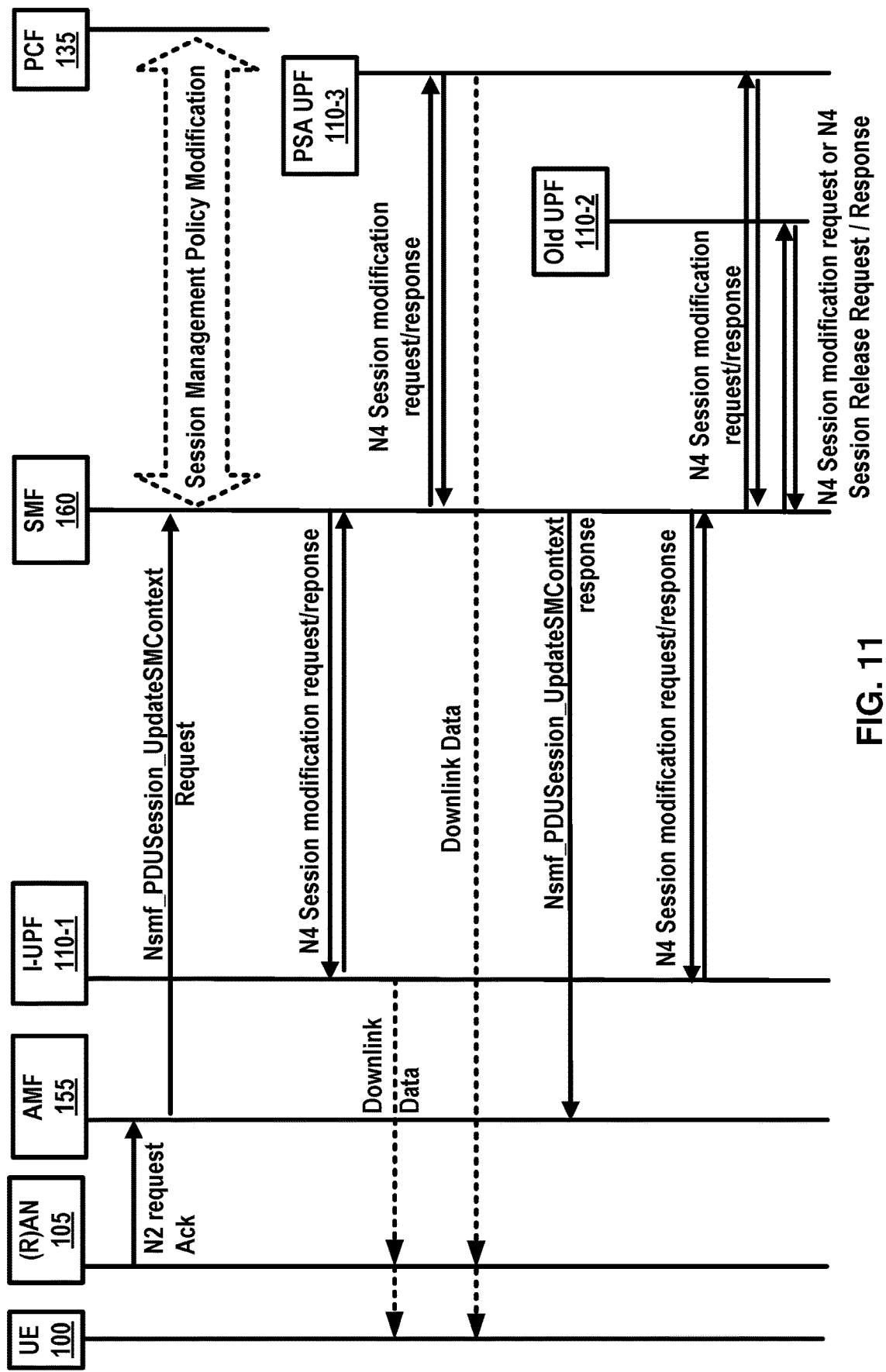
FIG. 11 is an example call flow as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non- 3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request e.g., Nsmf_PDUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send an Nsmf_PDUSession_UpdateSMContext request to SMF 160(s) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (i.e. IPv4, IPv6, ethernet type or unstructured type) and if applicable, the static IP address/prefix, SSC mode selected for the PDU session, UE 100 subscription profile in UDM 140, DNAI included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message e.g., a Nsmf_PDUSession_UpdateSMContext response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send an Nsmf_PDUSession_UpdateSMContext response to the AMF 155 to establish the user plane(s). The N2 SM information may contain information that the AMF 155 may provide to the RAN 105. In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSMContext response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSMContext response service operations from all the SMF 160s associated with the UE 100 may be received. In such case, the N2 request message may include the N2 SM information received in each of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that may be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure to the new I-UPF 110 and may provide AN tunnel info. The downlink data from the new I-UPF 110 may be forwarded to RAN 105 and UE 100. In an example, the UPF 110 may send to the SMF 160, an N4 session modification response. In an example, the SMF 160 may send to the AMF 155, an Nsmf_PDUSession_UpdateSMContext response.

In an example, if forwarding tunnel may be established to the new I-UPF 110 and if the timer SMF 160 set for forwarding tunnel may be expired, the SMF 160 may sends N4 session modification request to new (intermediate) UPF 110 acting as N3 terminating point to release the forwarding tunnel. In an example, the new (intermediate) UPF 110 may send to the SMF 160 an N4 session modification response. In an example, the SMF 160 may send to the PSA UPF 110-3 an N4 session modification request, or N4 session release request. In an example, if the SMF 160 may continue using the old UPF 110-2, the SMF 160 may send an N4 session modification request, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
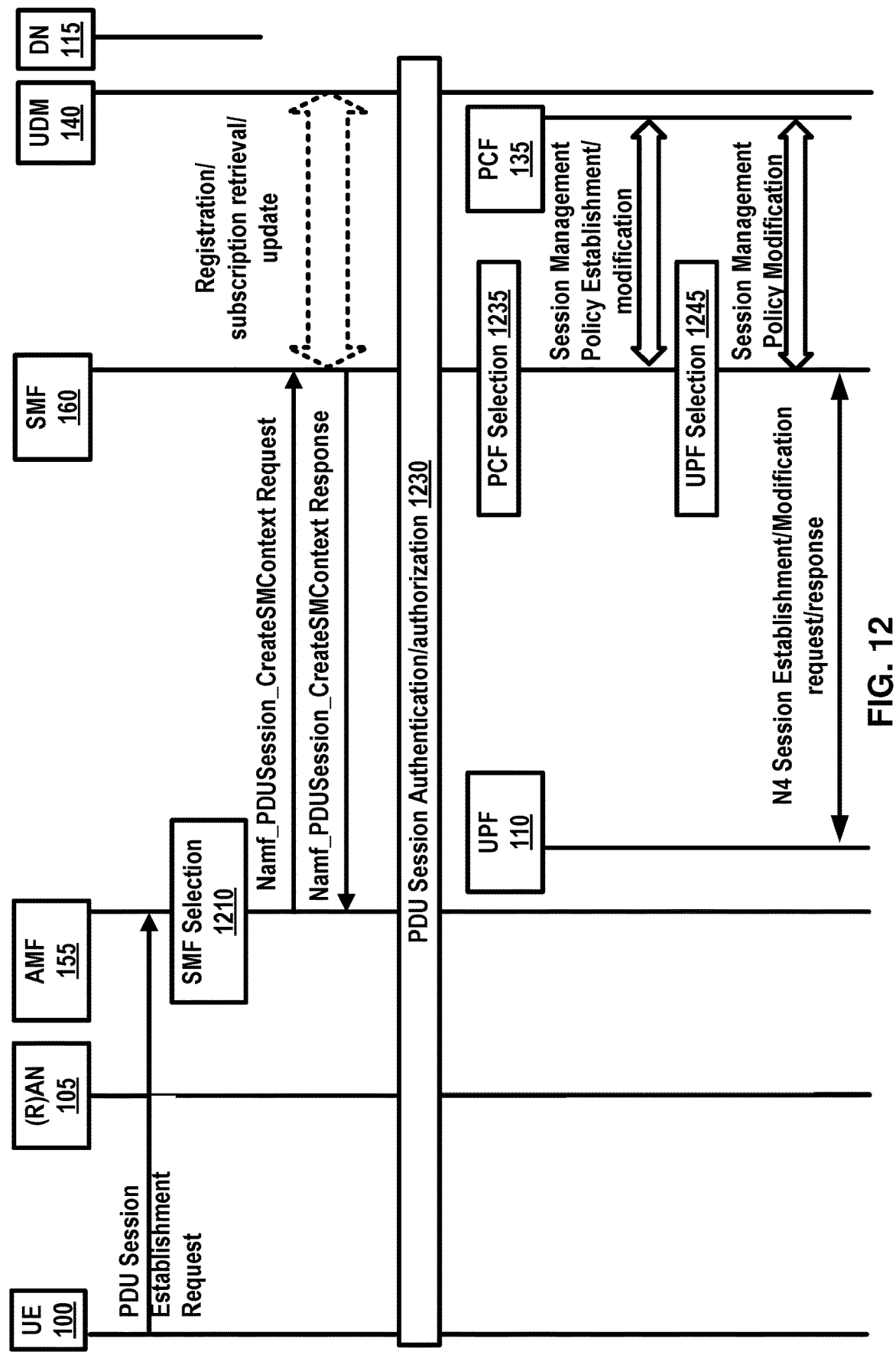
FIG. 12 is an example call flow as per an aspect of an embodiment of the present disclosure.
Figure 13:
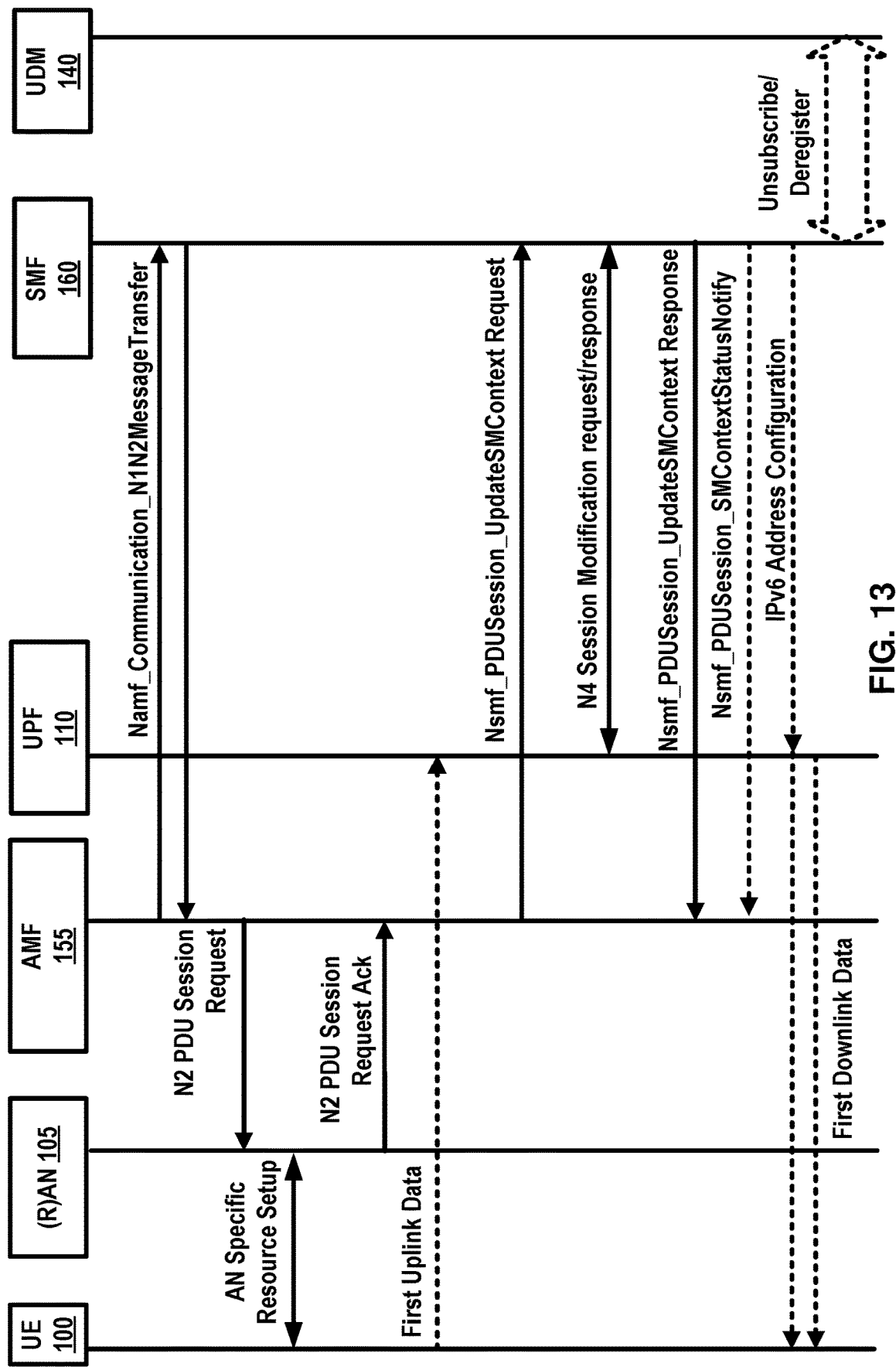
FIG. 13 is an example call flow as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the AN the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription if it may contain only one default S-NSSAI, or based on operator policy. In an example, the AMF 155 may perform SMF 160 selection and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message, e.g., Nsmf_PDUSession_CreateSMContext request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g. when request type indicates initial request), the AMF 155 may invoke the Nsmf_PDUSession_CreateSMContext request, but if the AMF 155 already has an association with an SMF 160 for the PDU session ID provided by the UE 100 (e.g. when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response, e.g., either a PDU session create/update response, Nsmf_PDUSession_CreateSMContext response (cause, SM context ID or N1 SM container (PDU session reject(cause))) or an Nsmf_PDUSession_UpdateSMContext response.

In an example, if the SMF 160 may perform secondary authorization/authentication during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure to establish a PDU session with the PCF 135 and may get the default PCC Rules for the PDU session. The GPSI may be included if available at the SMF 160. If the request type in N11 message indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in N11 message indicates initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in N11 message is existing PDU session, the SMF 160 may maintain the same IP address/prefix that may be allocated to the UE 100 in the source network.

In an example, if the request type in N11 message indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select the UPF 110 and may select SSC mode 1.

In an example, the SMF 160 may perform a session management policy modification procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure with the selected UPF 110. The SMF 160 may initiate an N4 session modification procedure with the selected UPF 110. In an example, the SMF 160 may send an N4 session establishment/modification request to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response. If CN tunnel info is allocated by the UPF, the CN tunnel info may be provided to SMF 160. In an example, if multiple UPFs are selected for the PDU session, the SMF 160 may initiate N4 session establishment/modification procedure with each UPF 110 of the PDU session.

In an example, the SMF 160 may send to the AMF 155 an Namf_Communication_N1N2MessageTransfer message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer may further comprise the PDU session ID and information allowing the AMF 155 to know which access towards the UE 100 to use.

In an example, the AMF 155 may send to the (R)AN105 an N2 PDU session request (comprising N2 SM information, NAS message (PDU session ID, N1 SM container (PDU session establishment accept, and/or the like))). In an example, the AMF 155 may send the NAS message that may comprise PDU session ID and PDU session establishment accept targeted to the UE 100 and the N2 SM information received from the SMF 160 within the N2 PDU session request to the (R)AN 105.

In an example, the (R)AN 105 may issue AN specific signaling exchange with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for each involved RAN 105 node, and the QFIs assigned to each tunnel endpoint. A QFI may be assigned to either the master RAN 105 node or the secondary RAN 105 node. In an example, (R)AN 105 may forward the NAS message (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure with the UPF110. The SMF 160 may provide AN tunnel info to the UPF 110 as well as the corresponding forwarding rules. In an example, the UPF 110 may provide an N4 session modification response to the SMF 160160.

In an example, the SMF 160 may send to the AMF 155 an Nsmf_PDUSession_UpdateSMContext response (Cause). In an example, the SMF 160 may subscribe to the UE 100 mobility event notification from the AMF 155 (e.g. location reporting, UE 100 moving into or out of area of interest), after this step by invoking Namf_EventExposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release). In an example, if during the procedure, any time the PDU session establishment is not successful, the SMF 160 may inform the AMF 155 by invoking Nsmf_PDUSession_SMContextStatusNotify(release). The SMF 160 may releases any N4 session(s) created, any PDU session address if allocated (e.g. IP address) and may release the association with the PCF 135.

In an example, in case of PDU type IPv6, the SMF 160 may generate an IPv6 Router Advertisement and may send it to the UE 100 via N4 and the UPF 110.

In an example, if the PDU session may not be established, the SMF 160 may unsubscribe to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister for the given PDU session using Nudm_UECM_Deregistration (SUPI, DNN, PDU session ID).

Figure 14:
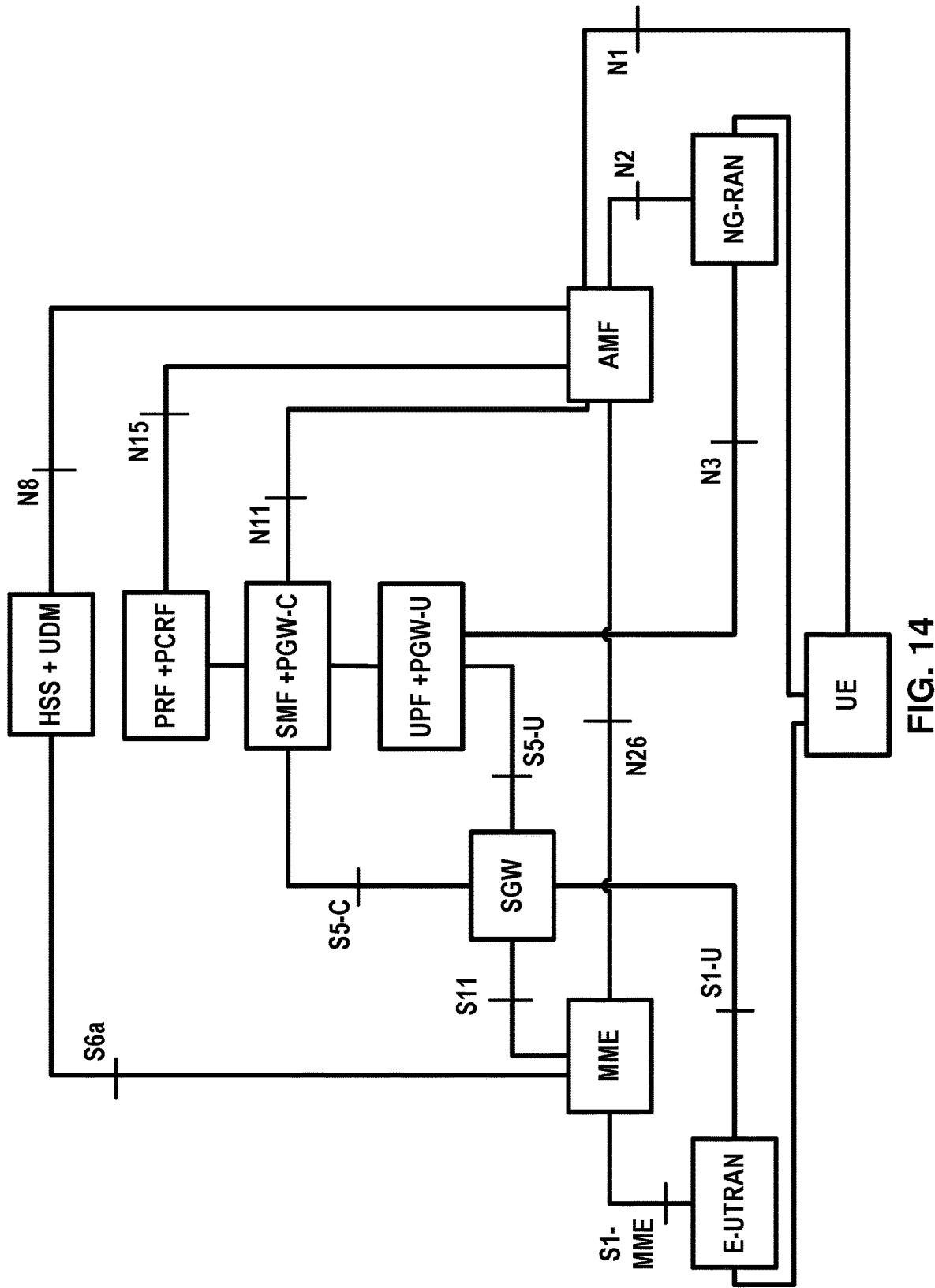
FIG. 14 is an example architecture for interworking between 5GS and E-UTRAN/EPC as per an aspect of an embodiment of the present disclosure.

FIG. 14 depicts an example non-roaming architecture for interworking between 5GS and E-UTRAN/EPC. N26 interface may be an inter-CN interface between an MME and 5GS AMF in order to enable interworking between EPC and NG/5G core. Support of N26 interface in the network may be optional for interworking. As an example, PCF+PCRF, PGW-C+SMF and UPF+PGW-U may be dedicated for interworking between 5GS and EPC, which may be optional and may be based on UE and network capabilities. UEs that are not subject to 5GS and EPC interworking may be served by entities not dedicated for interworking, i.e. either by PGW/PCRF or SMF/UPF/PCF. As an example, there may be another UPF (not shown in the figure) between NG-RAN and UPF+PGW-U, i.e. the UPF+PGW-U may support N9 towards an additional UPF, if needed.

In order to interwork with EPC, a UE that supports both 5GS and EPC NAS may operate in single-registration mode or dual-registration mode. In single-registration mode, the UE may have one active MM state (either RM state in 5GS or EMM state in EPC) and it may be either in 5GS NAS mode or in EPC NAS mode (when connected to 5GS or EPC, respectively). UE may maintain a single coordinated registration for 5GC and EPC. Accordingly, the UE may map EPS-GUTI to 5G GUTI during mobility between EPC and 5GS and vice versa following mapping rules. To enable re-use of a previously established 5G security context when returning to 5GS, the UE may also keep the 5G-GUTI and 5G security context when moving from 5GS to EPC. In an example, in dual-registration mode, the UE may handle independent registrations for 5GS and EPC. In this mode, the UE may maintain 5G-GUTI and EPS-GUTI independently. In an example, the UE may provide 5G-GUTI, if previously allocated by 5GS, for registrations towards 5GS and it may provide EPS-GUTI, if previously allocated by EPC, for Attach/TAU towards EPC. In this mode, the UE may be registered to 5GS only, EPC only, or to both 5GS and EPC.

To support mobility in dual-registration mode, support of N26 interface between AMF in 5GS and MME in EPC may not be required. For UE operating in dual-registration mode the following principles may be applied for PDU Session transfer from 5GS to EPC: the UE operating in dual registration mode may register in EPC ahead of any PDU Session transfer using an attach procedure indicating that the UE is moving from 5GS without establishing a PDN connection in EPC if the EPC supports EPS attach without PDN connectivity. Support for EPS attach without PDN connectivity may be mandatory for UE supporting dual-registration procedures. In an example, when the UE performs a PDU session transfer from 5GS to EPC, the UE may use a UE initiated PDN connection establishment procedure with handover indication in a PDN connection request message. If the UE has not registered with EPC ahead of the PDU session transfer, the UE may perform attach in EPC with handover indication in a PDN connection request message. The UE may selectively transfer certain PDU sessions to EPC, while keeping other PDU Sessions in 5GS. The UE may maintain the registration up to date in both 5GS and EPC by re-registering periodically in both systems. If the registration in either 5GS or EPC times out (e.g. upon mobile reachable timer expiry), the corresponding network may start an implicit detach timer. As an example, whether UE transfers some or all PDU sessions on the EPC side and whether it maintains the registration up to date in both EPC and 5GS may depend on the UE capabilities that are implementation dependent.

For UE operating in dual-registration mode the following principles may be applied for PDN connection transfer from EPC to 5GS: the UE operating in dual registration mode may register in 5GS ahead of any PDN connection transfer using a registration procedure indicating that the UE is moving from EPC. UE performs PDN connection transfer from EPC to 5GS may use a UE initiated PDU Session Establishment procedure with existing PDU session indication. The UE may selectively transfer certain PDN connections to 5GS, while keeping other PDN connections in EPC. The UE may maintain the registration up to date in both EPC and 5GS by re-registering periodically in both systems. If the registration in either EPC or 5GS times out (e.g. upon mobile reachable timer expiry), the corresponding network may start an implicit detach timer. As an example, whether UE transfers some or all PDN connections on the 5GS side and whether it maintains the registration up to date in both 5GS and EPC may depend on UE capabilities that are implementation dependent.

An IP multimedia core network (IM CN) subsystem (IMS) may comprise multiple CN elements for provision of multimedia services. This may include a collection of signaling and media related network elements. The IMS may enable operators to offer their subscribers multimedia services. The IMS may enable the convergence of, and access to, voice, video, messaging, data and web-based technologies for the wireless and wireline user.

A solution for supporting an IP multimedia application may consist of terminals, IP-Connectivity Access Networks (IP-CAN), and specific functional elements of the IMS. Examples of IP-Connectivity Access Network may be: a GPRS core network with GERAN and/or UTRAN radio access networks; an EPC core network and E-UTRAN radio access network; or a 5GS access network. IMS voice over PS may enable an IMS voice service over a packet switch session.

IMS centralized services (ICS) may provide communication services such that services, and service control, may be based on IMS mechanisms and enablers. It may enable IMS services when using CS access for a media bearer. User sessions may be controlled in IMS via PS or CS access.

An SCC AS may be a home network based IMS application that provides functionality required to enable IMS Centralized Services. The SCC AS may comprise a terminating access domain selection (T-ADS) functionality. The T-ADS functionality may select an access network and deliver an incoming session to an ICS User over the selected access network.

Figure 15:
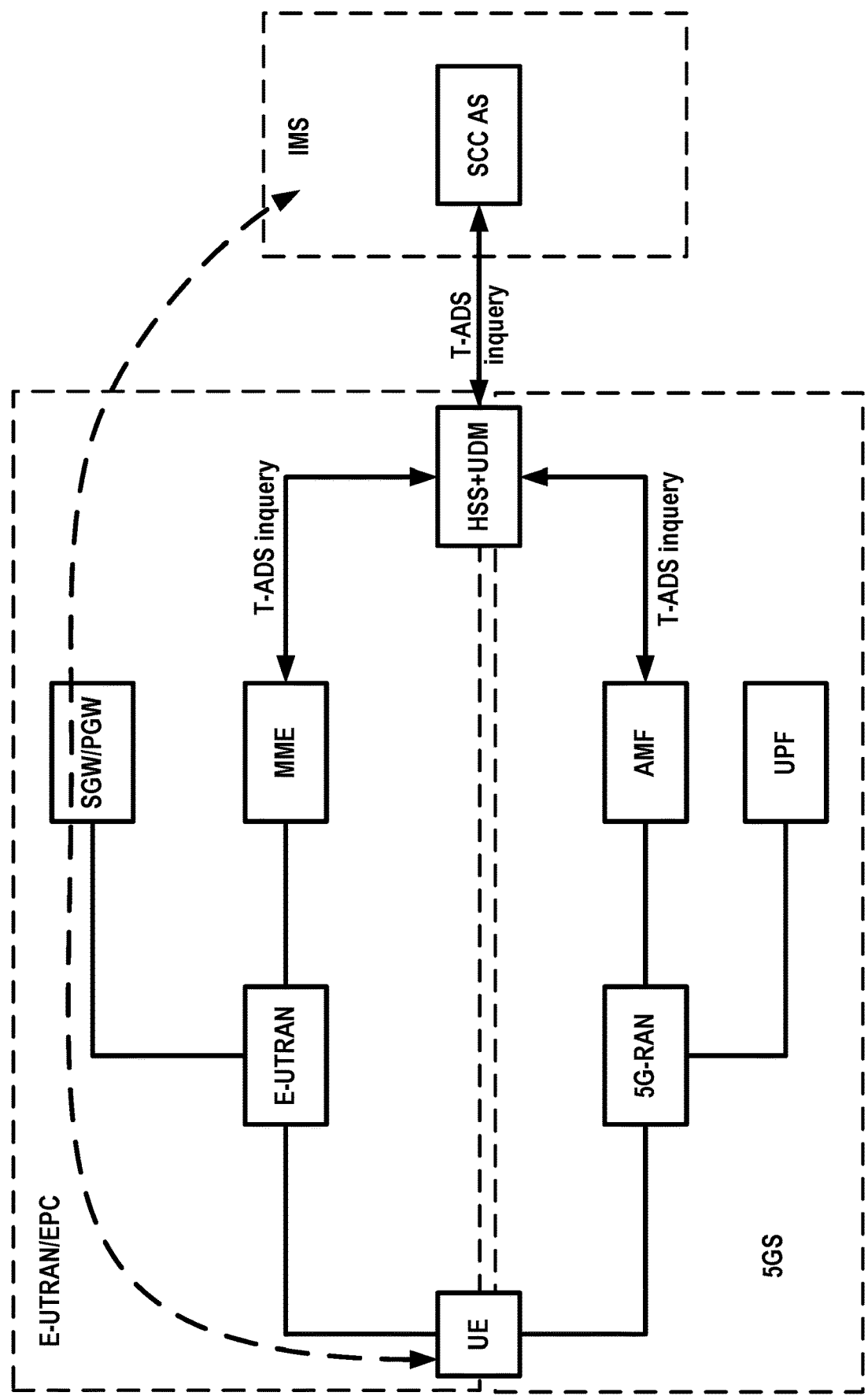
FIG. 15 is an example architecture for dual registered UE registering both 5GS and E-UTRAN/EPC as per an aspect of an embodiment of the present disclosure.
Figure 16:
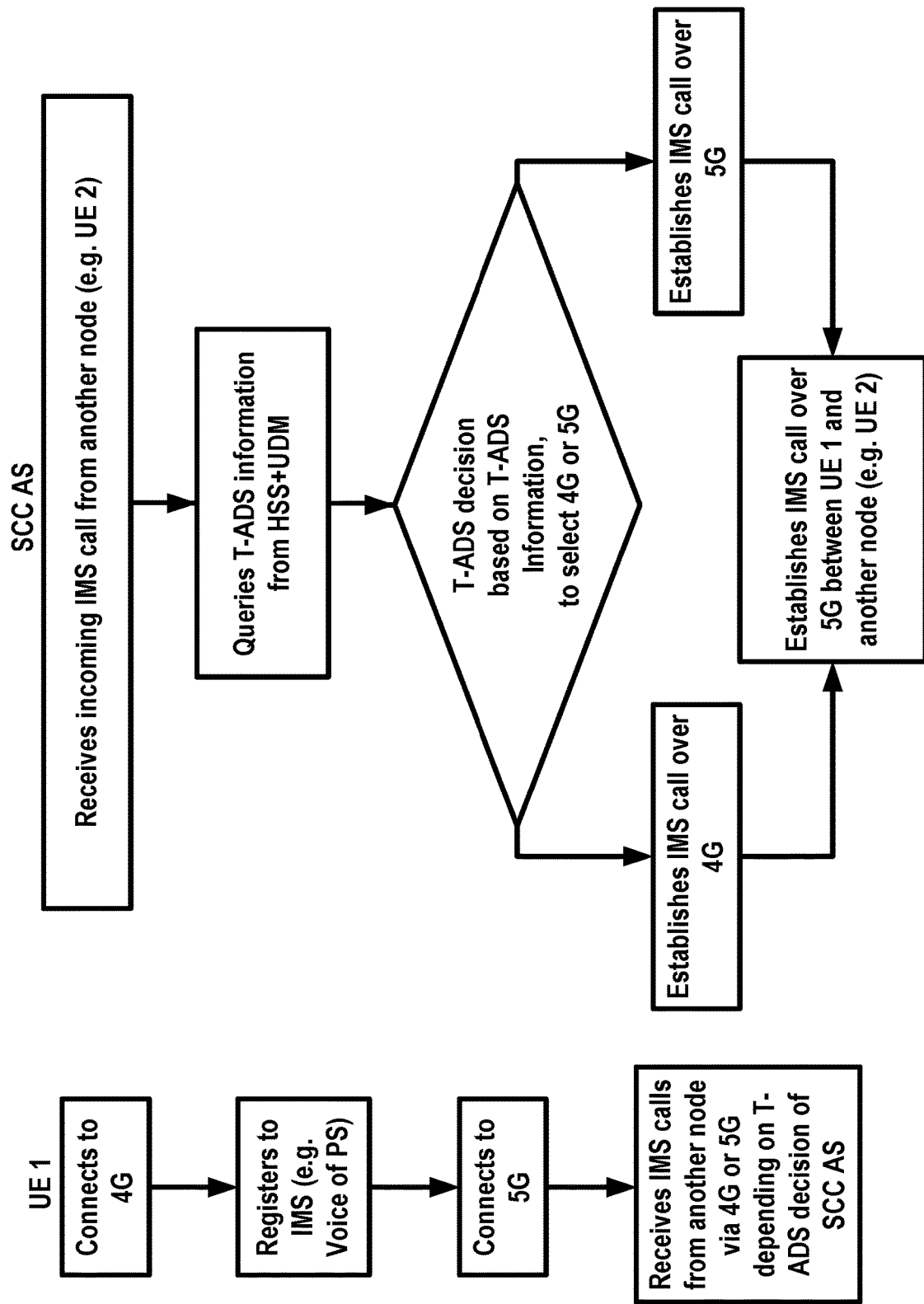
FIG. 16 is example procedures for dual registered UE and SCC AS when SCC AS received an incoming call as per an aspect of an embodiment of the present disclosure.

Implementation of the existing technologies may have issues supporting T-ADS for dual registered UE(s). As an example, referring to FIG. 15, a UE may register E-UTRAN/EPC and establish an IMS session. The E-UTRAN/EPC may support IMS voice over PS. The UE may later register to a 5G network that may not support IMS voice over PS. When an SCC AS (e.g. T-ADS functionality) queries an HSS+UDM for T-ADS, the HSS+UDM may query an MME and AMF for T-ADS related information since the UE is registered in both 5GS and EPC. The SCC AS may get the information that the UE had its most recent radio contact with 5GS. But, the 5G may not support IMS voice over PS. IN this case, the SCC AS may make a wrong decision that the UE is under a RAT that may not support the IMS voice over PS. So, in this case, the SCC AS may reroute the call to CS (if available) or to a voice mail rather than routing the call to the E-UTRAN/EPC. FIG. 16 depicts an example of the above procedures for dual registered UE and SCC AS.

As an example, a UE may have IMS sessions in both E-UTRAN/EPC and 5GS. In existing network technologies, a network node (e.g. SCC AS) may not be able to efficiently determine which network is associated with an IMS session, for example, when a single SUPI is shared with multiple IMS subscriptions (e.g. business and private subscriptions, that both can be used for voice service). Another example is when the SUPI may be bound to an IMS subscription that has multiple IMS registrations for different IMS services, e.g. SMS and voice.

Example embodiments provide enhanced mechanisms that enable T-ADS functionality to determine which network is associated with an IMS session. Example embodiments improve wireless access and core network resource utilization by reducing signaling in 4G and 5G networks and by routing a session to a proper network. Example embodiments increase network capacity that can enhance subscriber experiences. Example embodiments enable T-ADS functionality to get T-ADS information (e.g. IMS APN(s) and/or UE IP address) from an MME and/or AMF. This may assist the SCC AS to determine and select a terminating domain. Example embodiments provide enhanced mechanisms for the T-ADS functionality to access type information of the IMS registration for the wireless device from a P-CSCF to assist the SCC AS in determining and selecting a terminating domain.

Figure 17:
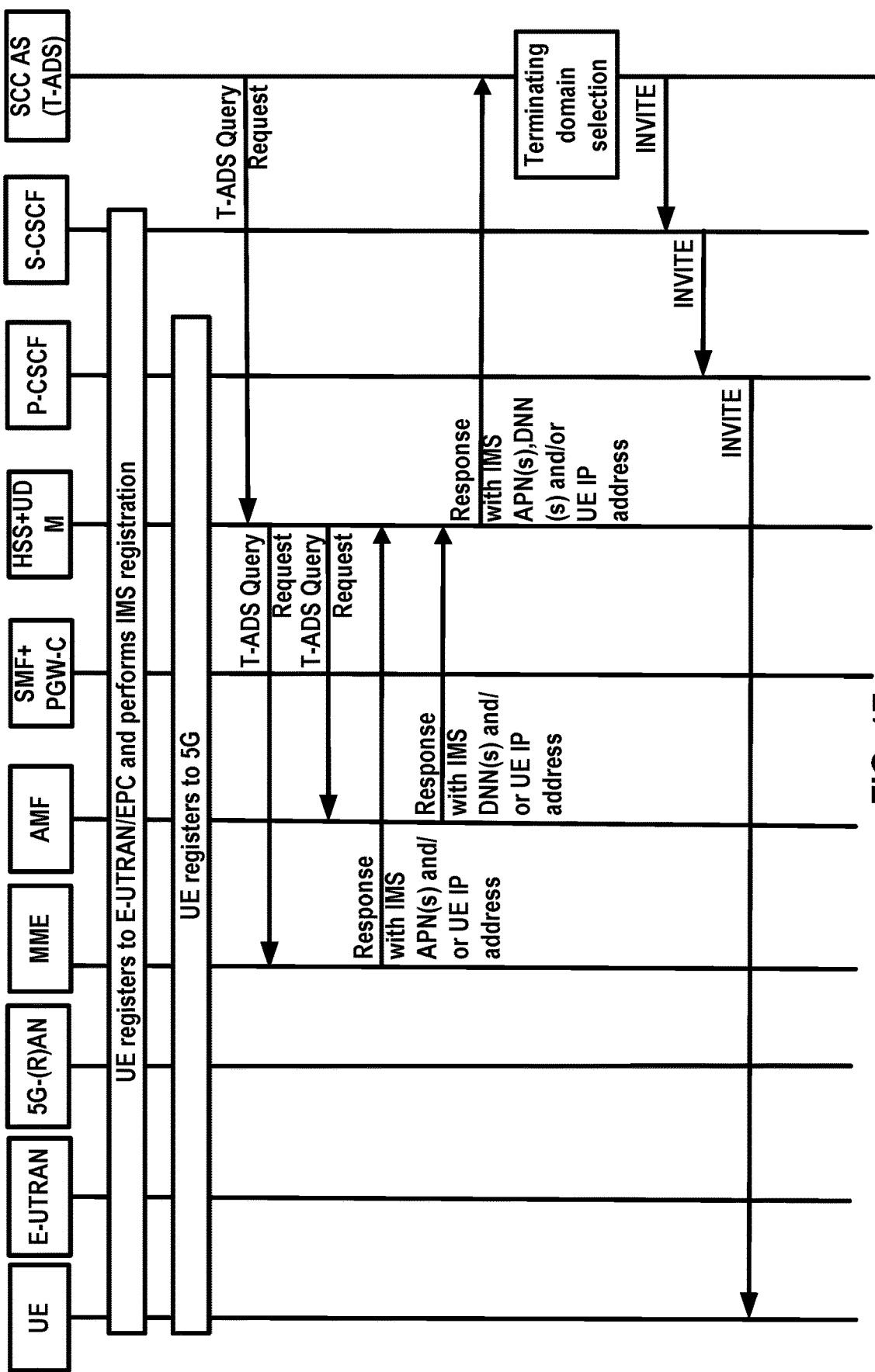
FIG. 17 is an example call flow diagram as per an aspect of an embodiment of the present disclosure.

In an example, a first dual registered UE may register/attach to E-UTRAN/EPC, and the first UE may register with IMS through E-UTRAN/EPC and establish an IMS session, where the E-UTRAN/EPC may support IMS voice over PS. The first UE may register with 5GS where the 5GS may not support IMS voice over PS. In an example, the IMS may receive an incoming call for a second UE, an SCC AS (e.g. T-ADS functionality) may require T-ADS information to select a terminating domain by querying an HSS+UDM. The HSS+UDM may query a serving MME and/or an AMF for T-ADS related information. FIG. 17 shows an example call flow which may comprise one or more of the following actions:

In an example, a first UE may attach to E-UTRAN/EPC, and a default bearer may be established. The first UE may register to the IMS with an IMS APN and establish an IMS session over E-UTRAN/EPC. The E-UTRAN/EPC may support IMS voice over PS. As an example, the default bearer of E-UTRAN/EPC may be used for IMS signaling and/or IMS application service (e.g. IMS voice over PS, video, etc.). As an example, a dedicated bearer of E-UTRAN/EPC may be used for IMS signaling and/or IMS application service. The MME may have the IMS APN information and/or UE IP address(es) information. In an example, the name of the APN for IMS may be IMS. As an example, the UE IP address(es) may be IPv4 address, IPv6 prefix, and/or IPv4 address and IPv6 prefix. The first UE may register to 5GS. The AMF may have the IMS DNN information and/or the UE IP address(es) information. The 5GS may not support IMS voice over PS. As another example, a first UE may register to 5GS, register IMS with an IMS APN and establish an IMS session over 5GS, and attach to E-UTRAN/EPC. The 5GS may support IMS voice over PS, and E-UTRAN/EPC may not support IMS voice over PS.

An SCC AS may comprise T-ADS functionality. The SCC AS may receive from another IMS entity (e.g. S-CSCF) an incoming IMS session to the first UE. The incoming session may be initiated by a second UE. The SCC AS may send to an HSS+UDM a message (e.g. T-ADS query request) to get T-ADS related information. The message may comprise one or more information elements. For example, an information element may indicate querying T-ADS information. An information element may indicate at least one identity of a UE, where the incoming IMS may be terminated to this UE. In an example, a UE identity may comprise: public user identities, comprising at least one taking the form of a SIP URI; private user identities; globally routable user agent URI (GRUU); wildcarded public user identity; combination thereof, and/or the like.

In response to the message received from the SCC AS, the HSS+UDM may take one or more of the following actions: the HSS+UDM may send to a serving MME a message (e.g. T-ADS query request) to get T-ADS related information, the message may comprise the information received from the SCC AS; and/or the HSS+UDM may send to a serving AMF a message (e.g. T-ADS query request) to get T-ADS related information, the message may comprise the information received from the SCC AS.

In response to the message received from the HSS+UDM, the serving MME may send to the HSS+UDM a response message (e.g. T-ADS query response) comprising one or more information elements for T-ADS information. For example, an information element may indicate whether a first radio technology (e.g. 3GPP-E-UTRAN) supports an IMS voice over packet-switched session; an information element may indicate at least one active IMS access point name (APN) applied to the first radio technology; an information element may indicate at least one first IP address of the UE applied to the first radio technology; an information element may indicate a first current RAT type (e.g. 3GPP-E-UTRAN); combination thereof, and/or the like. As an example, Diameter protocol may be used for the communication between the HSS+UDM and the MME. The following are example Diameter AVP definitions for the at least one first IP address of the UE and/or the APN:

IPv4-Address AVP: The IPv4-Address AVP (AVP Code x) is of type OctetString and contains an IPv4 address of the type specified in the attribute value to be configured for the user.
 IPv6-Prefix AVP: The IPv6-Prefix AVP (AVP Code y) is of type OctetString and contains the IPv6 prefix to be configured for the user.
 Access-Network-Name AVP: The Access-Network-Name AVP (AVP Code y) is of type UTF8String and indicates the address the user is connected to. The APN may be composed of the APN Network Identifier, or the APN Network Identifier and the APN Operator Identifier.

In response to the message received from the HSS+UDM, the serving AMF may send to the HSS+UDM a response message (e.g. T-ADS query response) comprising one or more information elements for T-ADS information. For example, an information element may indicate whether a second radio technology (e.g. 3GPP-NR) supports an IMS voice over packet-switched session; an information element may indicate at least one active (IMS) data network name (DNN) applied to the second radio technology; an information element may indicate at least one second IP address of the UE applied to the second radio technology, and this IP address may be the same as the first IP address sending from the serving MME to the HSS+UDM; an information element may indicate a time of the last radio contact with the UE; an information element may indicate a current access type (e.g. 3GPP) and/or a second RAT type (e.g. 3GPP-NR); combination thereof, and/or the like. As an example, HTTP protocol may be used for the communication between the HSS+UDM and the AMF. As an example, XML structure of simple element may be used as HTTP message content for UE IP Address and/or DNN. The following are example XML definitions for the at least one second IP address of the UE and/or the DNN:

<xs:element name="UEIP" type="xs:hexBinary"/>
 <xs:element name="UEIPv6" type="xs:hexBinary"/>
 <xs:element name="DNN" type="xs:string"/>

In response to the message received from the serving MME and/or AMF, the HSS+UDM may send to the SCC AS a response message (e.g. T-ADS query response) comprising one or more information elements for T-ADS information. For example, an information element may indicate whether a first radio technology (e.g. 3GPP-E-UTRAN) supports an IMS voice over packet-switched session; an information element may indicate at least one active Internet Protocol (IP) multimedia subsystem (IMS) access point name (APN) applied to the first radio technology; an information element may indicate at least a first IP address of the UE applied to the first radio technology; an information element may indicate a first current RAT type (e.g. 3GPP-E-UTRAN); an information element may indicate whether a second radio technology (e.g. 3GPP-NR) supports an IMS voice over packet-switched session; an information element may indicate at least one active (IMS) data network name (DNN) applied to the second radio technology; an information element may indicate at least one second IP address of the UE applied to the second radio technology, and this IP address may be the same as the first IP address sending from the serving MME to the HSS+UDM; an information element may indicate a time of the last radio contact with the UE; an information element may indicate a current access type (e.g. 3GPP) and/or a second RAT type (e.g. 3GPP-NR); combination thereof, and/or the like.

In response to the message received from the HSS+UDM and based on the T-ADS information received from the HSS+UDM, the SCC AS (e.g. IMS T-ADS functionality) may select an access network for delivery of the incoming session to the second UE, wherein the access network is one of the first RAT or the second RAT.

As an example, the SCC AS may receive from the HSS+UDM the indication that E-UTRAN/EPC supporting the IMS voice over PS, the active IMS APN and/or UE IPv4 address applied to the first radio technology E-UTRAN/EPC. The SCC AS may select the E-UTRAN/EPC for delivery of the incoming session to the first UE. The SCC AS may send a message (e.g. SIP INVITE) to an S-CSCF comprising the selected access network (e.g. E-UTRAN/EPC) and/or the information of the incoming session, where the S-CSCF may be the same PLMN for the UE. The S-CSCF may send to a P-CSCF the SIP INVITE comprising the selected access network (e.g. E-UTRAN/EPC) and/or information of the incoming session, and the P-CSCF may send to the first UE the SIP INVITE over the selected access network (e.g. E-UTRAN/EPC) comprising the information of the incoming session. As an example, a new IMS session may be established between the first UE and the second UE who has initiated the incoming session.

The above example embodiment may provide a network-based solution to resolve issues in supporting T-ADS for dual registered UE, while the existing technologies may depend on UE implementation to decide which PDU sessions are kept in which system (e.g. E-UTRAN/EPC, 5GS) for dual registration UE, such existing solution may cause interworking problems.

The above example embodiment may provide a solution that an SCC AS may still need T-ADS functionality to determine and select a right terminating domain for the case where dual registration uses two PS only registrations (e.g. register to E-UTRAN/EPC and/or 5GS, but not register to CS), while the existing technologies may have an assumption that there is no need for T-ADS for such case.

The above example embodiment may provide a solution that the dual registration UE may keep IMS sessions in both systems (e.g. keep IMS sessions in E-UTRAN/EPC and 5GS), while the existing technologies may have an assumption that a dual registration UE may only keep IMS sessions in one of the two systems.

The above example embodiment may provide a solution that dual registration UE may establish a first IP-CAN session for IMS over one system (e.g. E-UTRAN/EPC) with IP address 1, and a second PDU session for IMS over another system (e.g. 5GS) with IP address 2, where IP address 1 may be different with IP address 2; however, the existing technologies may have an assumption that IP address 1 is the same as IP address 2.

Figure 18:
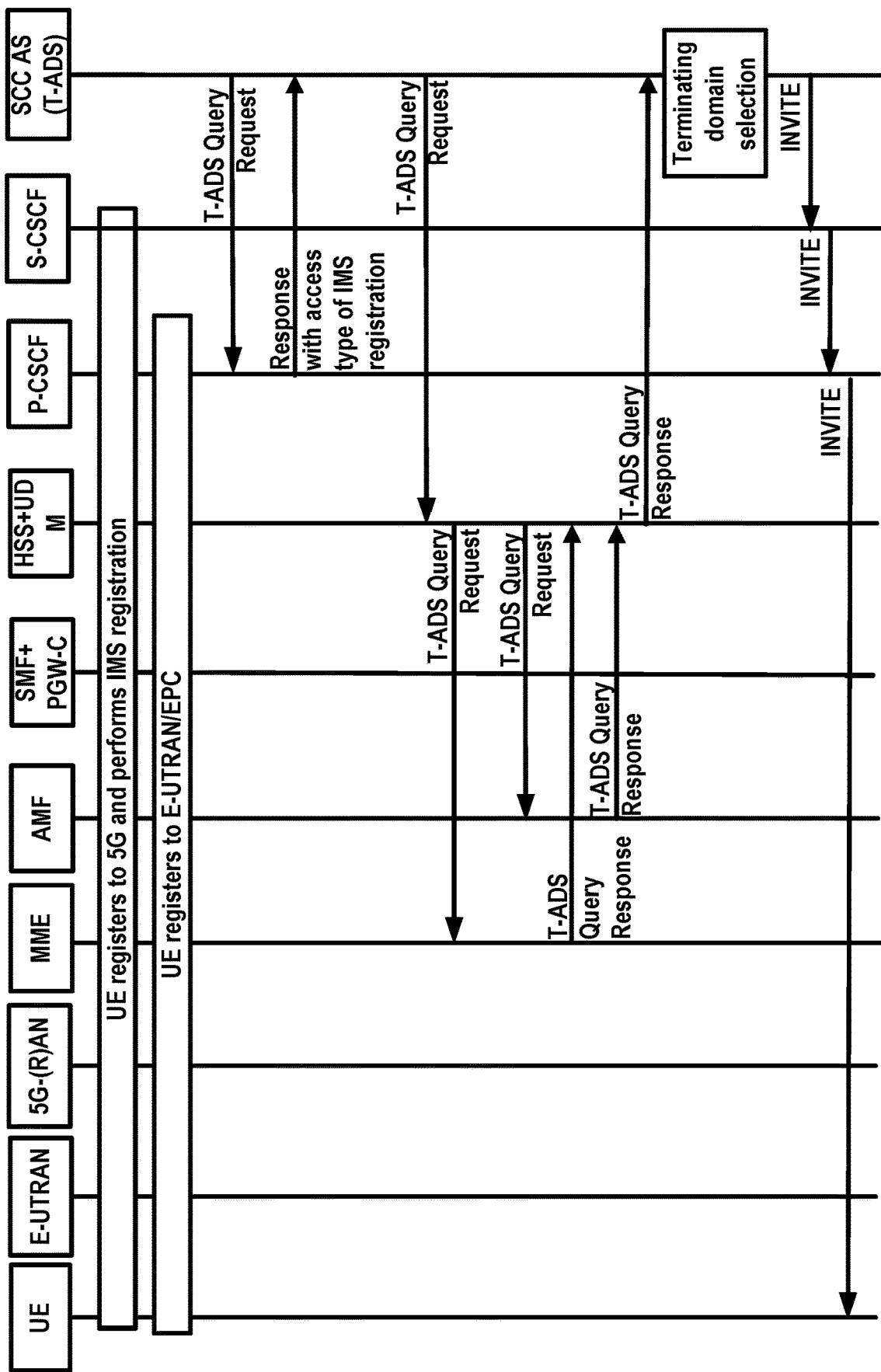
FIG. 18 is an example call flow diagram as per an aspect of an embodiment of the present disclosure.

In an example, in order to direct an incoming IMS session to a first UE, an SCC AS (e.g. T-ADS functionality) may query a P-CSCF for T-ADS related information, the P-CSCF may response to the SCC AS an access type of IMS registration. FIG. 18 shows an example call flow which may comprise one or more of the following actions:

A first UE may attach to 5GS, and the first UE may register IMS with an IMS DNN and establish an IMS session over 5GS. The 5GS may support IMS voice over PS. An SCC AS may comprise T-ADS functionality, and the SCC AS may receive from another IMS entity (e.g. S-CSCF) an incoming IMS session to the first UE. The incoming session may be initiated by a second UE. The SCC AS may send to a P-CSCF a message (e.g. T-ADS query request) to get T-ADS related information. The message may comprise one or more information elements. For example, an information element may indicate a query of an access type information of an IMS registration for the first UE; an information element may indicate one or more identities of the first UE, where the incoming IMS may be terminated to this UE. In an example, the identity of the first UE may comprise: public user identities, comprising at least one taking the form of a SIP URI; private user identities; globally routable user agent URI (GRUU); wildcarded public user identity; combination thereof, and/or the like. As an example, the SCC AS may send a message to a P-CSCF through an S-CSCF.

In response to the message received from the SCC AS, the P-CSCF may send to the SCC AS a response message comprising one or more information elements. For example, an information element may indicate an access type information of an IMS registration for the first UE (e.g. 3GPP-NR/5GS); an information element may indicate one or more identities of the first UE; combination thereof, and/or the like. As an example, the P-CSCF may send to the SCC AS the response message through an S-CSCF.

The SCC AS may send to an HSS+UDM a message (e.g. T-ADS query request) to get T-ADS related information. The message may comprise one or more information elements. For example, an information element may indicate querying T-ADS information. An information element may indicate at least one identity of a UE (e.g. the first UE), where the incoming IMS may be terminated to this UE. In an example, a UE identity may comprise: public user identities, comprising at least one taking the form of a SIP URI; private user identities; globally routable user agent URI (GRUU); wildcarded public user identity; combination thereof, and/or the like.

In response to the message received from the SCC AS, the HSS+UDM may take one or more of the following actions: the HSS+UDM may send to a serving MME a message (e.g. T-ADS query request) to get T-ADS related information, the message may comprise the information received from the SCC AS; and/or the HSS+UDM may send to a serving AMF a message (e.g. T-ADS query request) to get T-ADS related information, the message may comprise the information received from the SCC AS.

In response to the message received from the HSS+UDM, the serving MME may send to the HSS+UDM a response message (e.g. T-ADS query response) comprising one or more information elements for T-ADS information. For example, an information element may indicate whether a first radio technology (e.g. 3GPP-E-UTRAN) supports an IMS voice over packet-switched session, and as an example, the 3GPP-E-UTRAN does not support an IMS voice over PS; an information element may indicate a first current RAT type (e.g. 3GPP-E-UTRAN); combination thereof, and/or the like.

In response to the message received from the HSS+UDM, the serving AMF may send to the HSS+UDM a response message (e.g. T-ADS query response) comprising one or more information elements for T-ADS information. For example, an information element may indicate whether a second radio technology (e.g. 3GPP-NR) supports an IMS voice over packet-switched session, and as an example, the 3GPP-NR/5GS supports an IMS voice over PS; an information element may indicate a time of the last radio contact with the UE; an information element may indicate a current access type (e.g. 3GPP) and/or a second RAT type (e.g. 3GPP-NR); combination thereof, and/or the like.

In response to the message received from the serving MME and/or AMF, the HSS+UDM may send to the SCC AS a response message (e.g. T-ADS query response) comprising one or more information elements for T-ADS information. For example, an information element may indicate whether a first radio technology (e.g. 3GPP-E-UTRAN) supports an IMS voice over packet-switched session; an information element may indicate a first current RAT type (e.g. 3GPP-E-UTRAN); an information element may indicate whether a second radio technology (e.g. 3GPP-NR) supports an IMS voice over packet-switched session; an information element may indicate a time of the last radio contact with the UE; an information element may indicate a current access type (e.g. 3GPP) and/or a second RAT type (e.g. 3GPP-NR); combination thereof, and/or the like. Based on the T-ADS information received from the P-CSCF and HSS+UDM, the SCC AS (e.g. IMS T-ADS functionality) may select an access network for delivery of the incoming session to the second UE, wherein the access network is one of the first RAT or the second RAT.

As an example, the SCC AS may receive from the P-CSCF the access type information of an IMS registration for the UE (e.g. 3GPP-NR/5GS); the SCC AS may receive from the HSS+UDM the indication that 3GPP-NR/5GS supports an IMS voice over PS. The SCC AS may select the 3GPP-NR/5GS for delivery of the incoming session to the first UE. The SCC AS may send a message (e.g. SIP INVITE) to an S-CSCF comprising the selected access network (e.g. 3GPP-NR/5GS) and/or the information of the incoming session, where the S-CSCF may be the same PLMN for the first UE. The S-CSCF may send to a P-CSCF the SIP INVITE comprising the selected access network (e.g. 3GPP-NR/5GS) and/or information of the incoming session, and the P-CSCF may send to the first UE the SIP INVITE over the selected access network (e.g. 3GPP-NR/5GS) comprising the information of the incoming session. As an example, a new IMS session may be established between the first UE and the second UE who has initiated the incoming session.

As an example, a subscriber server may receive from an application server, a first message indicating a first query for domain information for a wireless device, the T-ADS information comprising a first domain information and a second domain information. The subscriber server may send to a serving mobility management entity (MME) in response to the first message, a second message indicating a second query for the first domain information for the wireless device. The subscriber server may send to a serving access and mobility management function (AMF) in response to the first message, a third message indicating a third query for the second domain information for the wireless device. The subscriber server may receive from the serving MME, a fourth message comprising the first domain information comprising: a first information element indicating whether a first radio technology supports an IMS voice over packet-switched session; an active Internet Protocol (IP) multimedia subsystem (IMS) access point name; and/or a first IP address of the wireless device. The subscriber server may receive from the serving AMF, a fifth message comprising the second domain information comprising: a second information element indicating whether a second radio technology supports an IMS voice over packet-switched session; an active IMS data network name; and/or a second IP address of the wireless device. The subscriber server may send to the application server, at least one sixth message comprising the domain information. As an example, the domain information may comprise terminating-access domain selection information. As an example, the application server may perform IMS T-ADS functionality. As an example, the subscriber server may perform at least one of: home subscriber station functionality; and user data management functionality. As an example, the SCC AS (e.g. IMS T-ADS functionality) may select an access network for delivery of the incoming session to the wireless device, wherein the access network is one of the first RAT or the second RAT. As an example, the SCC AS may send a message (e.g. SIP INVITE) to an S-CSCF comprising the selected access network (e.g. E-UTRAN/EPC) and/or the information of the incoming session. As an example, the T-ADS information may further comprise at least one of: a first information element (IE) indicating either a first radio access technology (RAT) or a second RAT supports an IMS voice over PS session; a second IE indicating a serving RAT comprising either the first RAT or the second RAT; a third IE indicating a serving access network; a fourth IE indicating a time of a last radio contact with the wireless device; As an example, the first RAT is a long term evolution network and the second RAT is a 5GS network.

The IMS T-ADS functionality may send to a P-CSCF, a first message indicating a query of an access type information of an IMS registration for the wireless device. The IMS T-ADS functionality may receive from the P-CSCF in response to the first message, a second message comprising an access type information of the IMS registration for the wireless device. As an example, an IMS T-ADS functionality may send to an HSS+UDM, a third message indicating a T-ADS information query for a wireless device. The IMS T-ADS functionality may receive from the HSS+UDM in response to the third message, a fourth message comprising a T-ADS information of the wireless device, wherein the T-ADS information comprises: a first information element indicating that a first radio access technology (RAT) or a second RAT supports an IMS voice over PS session; a second IE indicating a serving access network; and a third IE indicating a time of a last radio contact with the wireless device. The IMS T-ADS may select an access network for delivery of an incoming session to an ICS User contact address(es) based on the T-ADS information received from the P-CSCF and HSS+UDM. As an example, the IMS T-ADS may send a message (e.g. SIP INVITE) to an S-CSCF comprising the selected access network (e.g. E-UTRAN/EPC) and/or the information of the incoming session. As an example, the UDM+HSS may send to a serving MME and a serving AMF, a second message to query T-ADS related information. The UDM+HSS may receive from the serving MME a response message to the second message, comprising one or more of the following information: whether or not an IMS voice over PS Session is supported; and the current RAT type. The UDM+HSS may receive from the serving AMF a response message to the second message, comprising one or more of the following information: whether or not IMS voice over PS Session is supported; the time of the last radio contact with the UE; the current Access Type and RAT type.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 19:
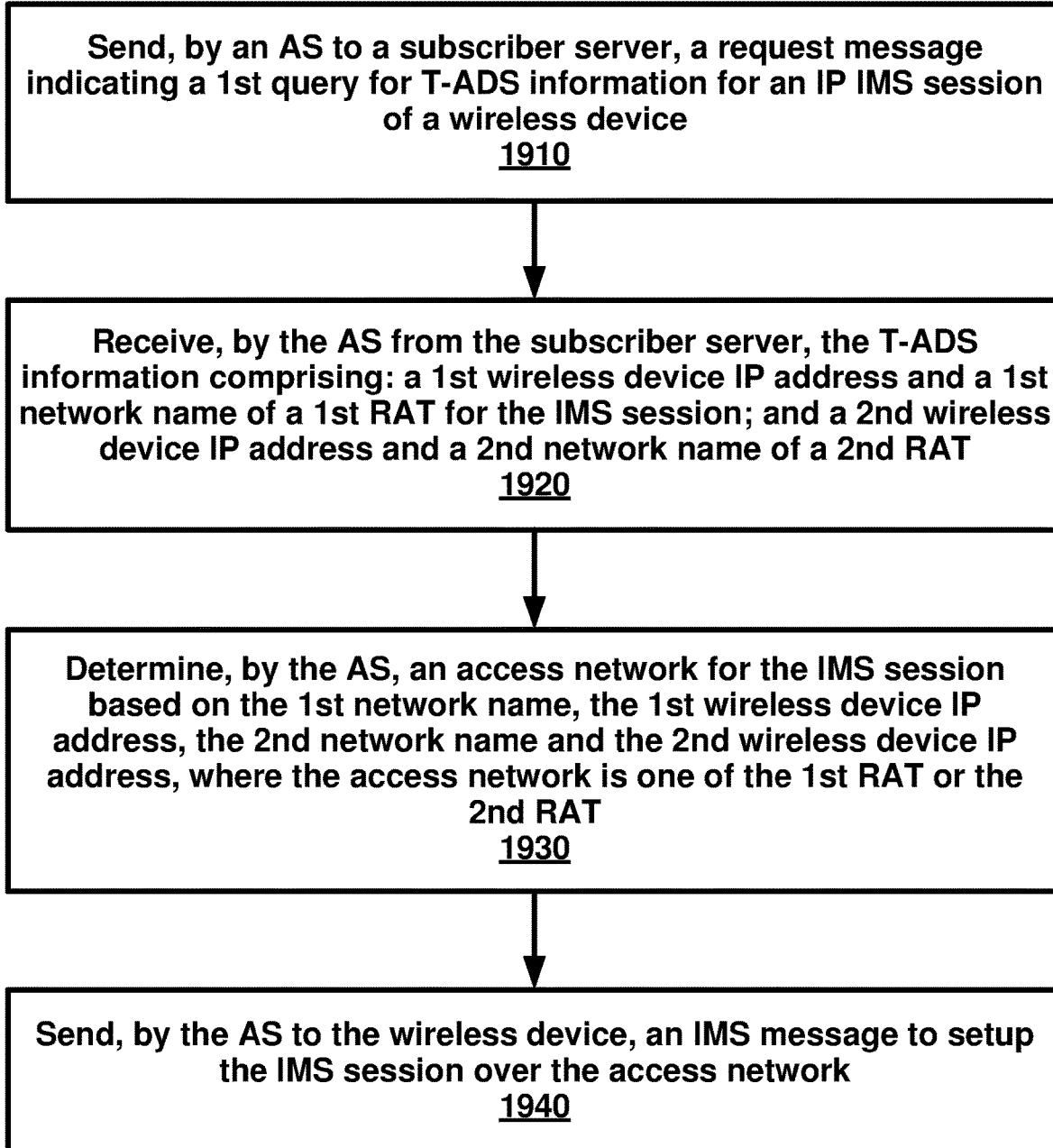
FIG. 19 is an example flow diagram as per an aspect of an embodiment of the present disclosure.

FIG. 19 is an example flow diagram as per an aspect of an embodiment of the present disclosure. At 1910, an application server may send to a subscriber server, a request message indicating a first query for terminating access domain selection (T-ADS) information for an Internet protocol multimedia subsystem (IMS) session of a wireless device. At 1920, the application server may receive from the subscriber server, the T-ADS information. The T-ADS information may comprise a first wireless device Internet protocol (IP) address and a first network name of a first radio access technology (RAT) for the IMS session. The T-ADS information may comprise a second wireless device IP address and a second network name of a second RAT. At 1930, the application server may determine an access network for the IMS session based on the first network name, the first wireless device IP address, the second network name and the second wireless device IP address. The access network may be one of the first RAT or the second RAT. At 1940, the application server may send an IMS message to the wireless device. The IMS message may be to setup the IMS session over the access network.

According to an example embodiment, the application server may be a service centralization and continuity application server (SCC AS). According to an example embodiment, the application server may perform IMS T-ADS functionality. According to an example embodiment, the subscriber server may be a home subscriber server. According to an example embodiment, the subscriber server may be a unified data management. According to an example embodiment, the first network name may be an access point name. According to an example embodiment, the second network name may be a data network name.

According to an example embodiment, the T-ADS information may further comprise a first RAT type. According to an example embodiment, the first RAT type may be a long term evolution (LTE) RAT type. According to an example embodiment, the T-ADS information may comprise a second radio RAT type. According to an example embodiment, the second RAT type may be a 5G RAT type. According to an example embodiment, the T-ADS information may comprise an information element indicating whether the first RAT supports an IMS voice over packet-switched session. According to an example embodiment, the T-ADS information may comprise an information element indicating whether the second RAT supports an IMS voice over packet-switched session.

According to an example embodiment, the determining may comprise whether the first RAT supports an IMS voice over packet-switched session, and/or the second RAT supports an IMS voice over packet-switched session. According to an example embodiment, the application server may receive from a call session control function (CSCF), a message requesting establishment of an IMS session for a second wireless device.

FIG. 20 is an example flow diagram as per an aspect of an embodiment of the present disclosure. At 2010, the subscriber server may send a message to a mobility management entity (MME). The message may indicate a second query for a first domain information. At 2020, the subscriber server may receive the first network name from the MME.

At 2030, the subscriber server may send a message to a mobility management entity (MME). The message may indicate a second query for a first domain information. At 2040, the subscriber server may receive the first wireless device IP address from the MME.

According to an example embodiment, the subscriber server may receive an LTE RAT type from the MME. According to an example embodiment, the subscriber server may receive an information element from the MME. The information element may indicate whether the LTE RAT type supports an IMS voice over packet-switched session.

Figure 21:
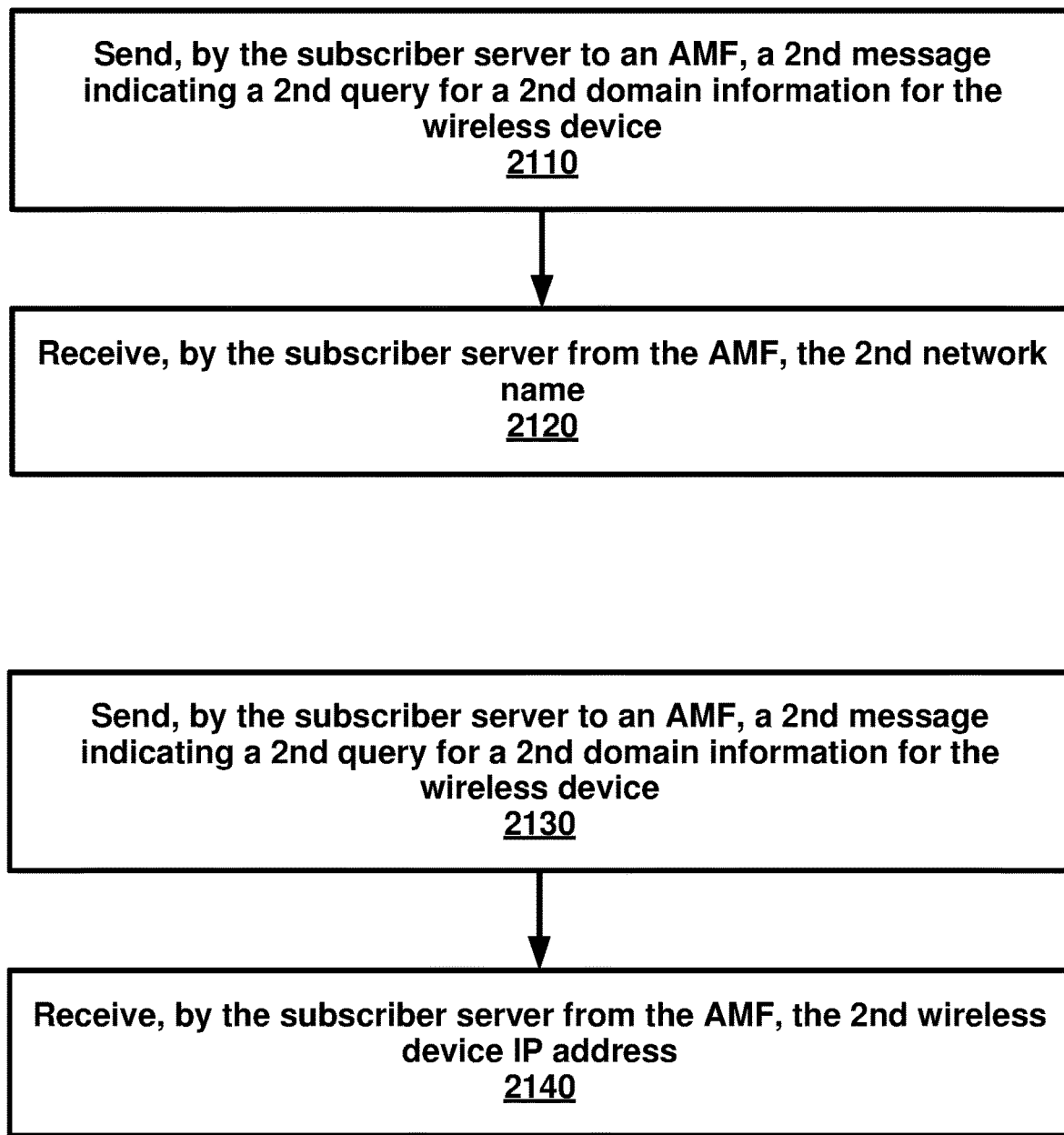
FIG. 21 is an example flow diagram as per an aspect of an embodiment of the present disclosure.

FIG. 21 is an example flow diagram as per an aspect of an embodiment of the present disclosure. At 2110, the subscriber server may send a second message to an access and mobility management entity (AMF). The second message may indicate a second query for a second domain information for the wireless device. At 2120, the subscriber server may receive the second network name from the AMF. At 2130, the subscriber server may send a second message to an access and mobility management entity (AMF). The second message may indicate a second query for a second domain information for the wireless device. At 2140, the subscriber server may receive the second wireless device IP address from the AMF. According to an example embodiment, the subscriber server may receive a second RAT type from the AMF. According to an example embodiment the subscriber server may receive an information element from the AMF. The information element may indicate whether the second RAT supports an IMS voice over packet-switched session.

FIG. 22 is an example flow diagram as per an aspect of an embodiment of the present disclosure. At 2210, an application server may send a request message to a subscriber server. The request message may indicate a first query for terminating access domain selection (T-ADS) information for an Internet protocol multimedia subsystem (IMS) session of a wireless device. At 2220, the application server may receive the T-ADS information from the subscriber server. The T-ADS information may comprise a first network name of a first radio access technology (RAT) for the IMS session. The T-ADS information may comprise a second network name of a second RAT. At 2230, the application server may determine an access network for the IMS session based on the first network name and the second network name. The access network may be one of the first RAT or the second RAT. At 2240, the application server may send a message to the wireless device. The message may be to setup the IMS session over the access network.

FIG. 23 is an example flow diagram as per an aspect of an embodiment of the present disclosure. At 2310, a subscriber server may receive a message from an application server. The message may indicate a first query for terminating access domain selection (T-ADS) information for an Internet protocol multimedia subsystem (IMS) session of a wireless device. At 2320, the subscriber server may send a first request message to an access and mobility management function in response to receiving the message. The first request message may be for a first T-ADS information. At 2330, the subscriber server may receive a first response message from the access and mobility management function. The first response message may comprise the first T-ADS information. The first T-ADS information may comprise a first wireless device Internet protocol (IP) address and a first network name of a first radio access technology (RAT) for the IMS session. At 2340, the subscriber server may send a second request message to a mobility management entity in response to receiving the message. The second request message may be for a second T-ADS information. At 2350, the subscriber server may receive a second response message from the mobility management entity. The second response message may comprise the second T-ADS information. The second T-ADS information may comprise a second wireless device Internet protocol (IP) address. The second T-ADS information may comprise a second network name of a second radio access technology (RAT) for the IMS session. At 2360, the subscriber server may send the first T-ADS information and the second T-ADS information to the application server. The first T-ADS information and the second T-ADS information may be for selection of one of a first access network and a second access network for the IMS session.

FIG. 24 is an example flow diagram as per an aspect of an embodiment of the present disclosure. At 2410, a subscriber server may receive a message from an application server. The message may indicate a first query for terminating access domain selection (T-ADS) information for an Internet protocol multimedia subsystem (IMS) session of a wireless device. At 2420, the subscriber server may send a first request message to an access and mobility management function in response to receiving the message. The first request message may be for a first T-ADS information. At 2430, the subscriber server may receive a first response message from the access and mobility management function. The first response message may comprise the first T-ADS information. The first T-ADS information may comprise a first wireless device Internet protocol (IP) address and a first network name of a first radio access technology (RAT) for the IMS session. At 2440, the subscriber server may send the first T-ADS information to the application server for selection of an access network for the IMS session.

Figure 25:
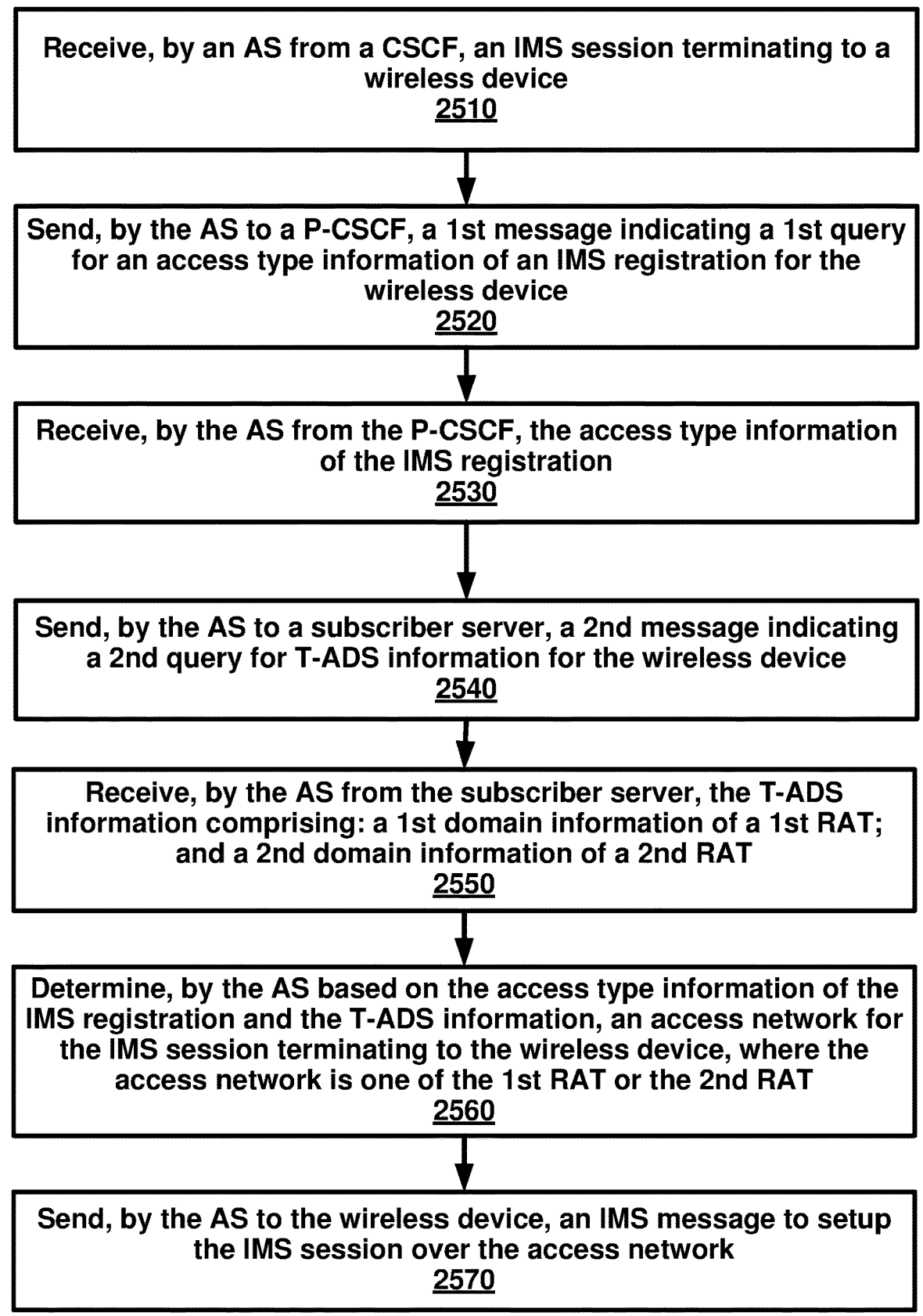
FIG. 25 is an example flow diagram as per an aspect of an embodiment of the present disclosure.

FIG. 25 is an example flow diagram as per an aspect of an embodiment of the present disclosure. At 2510, an application server may receive from a call session control function (CSCF), an internet protocol multimedia core network subsystem (IMS) session terminating to a wireless device. At 2520, the application server may send a first message to a proxy call session control function (P-CSCF). The first message may indicate a first query for an access type information of an IMS registration for the wireless device. At 2530, the application server may receive the access type information of the IMS registration from the P-CSCF. At 2540, the application server may send a second message to a subscriber server. The second message may indicate a second query for terminating access domain selection (T-ADS) information for the wireless device. At 2550, the application server may receive the T-ADS information from the subscriber server. The T-ADS information may comprise a first domain information of a first radio access technology (RAT). The T-ADS information may comprise a second domain information of a second RAT. At 2560, the application server may determine, based on the access type information of the IMS registration and the T-ADS information, an access network for the IMS session terminating to the wireless device. The access network may be one of the first RAT or the second RAT. At 2570, the application server may send an IMS message to the wireless device to setup the IMS session over the access network.

According to an example embodiment, the determining may be based on the access type information of an IMS registration. According to an example embodiment, the determining may be based on the T-ADS information indicating the first RAT or second RAT supports an IMS voice over packet service (PS). According to an example embodiment, the access type information of the IMS registration may be the first RAT. According to an example embodiment, the access type information of the IMS registration may be the second RAT.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various Examples. If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}.

In this specification, various Examples are disclosed. Limitations, features, and/or elements from the disclosed example Examples may be combined to create further Examples within the scope of the disclosure.

In this specification, various Examples are disclosed. Limitations, features, and/or elements from the disclosed example Examples may be combined to create further Examples within the scope of the disclosure.

In this specification, parameters (Information elements: IEs) may comprise one or more objects, and one of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example, when one or more messages comprise a plurality of parameters, it implies that a parameter in the plurality of parameters is in at least one of the one or more messages, but does not have to be in one of the one or more messages.

Many of the elements described in the disclosed Examples may be implemented as modules. A module is defined here as an isolatable element that performs a defined function and has a defined interface to other elements. The modules described in this disclosure may be implemented in hardware, software in combination with hardware, firmware, wetware (e.g. hardware with a biological element) or a combination thereof, some of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various Examples have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative Examples. Thus, the present Examples should not be limited by any of the above described exemplary Examples. In particular, it should be noted that, for example purposes, the above explanation has focused on the example(s) using 5G AN. However, one skilled in the art will recognize that Examples of the invention may be implemented in a system comprising one or more legacy systems or LTE. The disclosed methods and systems may be implemented in wireless or wireline systems. The features of various Examples presented in this invention may be combined. One or many features (method or system) of one Example may be implemented in other Examples. A limited number of example combinations are shown to indicate to one skilled in the art the possibility of features that may be combined in various Examples to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some examples.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method performed by an application server, comprising:
receiving, from a subscriber server, terminating access domain selection (T-ADS) information for an Internet protocol multimedia subsystem (IMS) session of a wireless device, wherein the T-ADS information comprises:
a first wireless device Internet protocol (IP) address and a first network name of a first radio access technology (RAT) for the IMS session; and
a second wireless device IP address and a second network name of a second RAT;
determining an access network for the IMS session based on the T-ADS information, wherein the access network is one of the first RAT or the second RAT; and
sending, to the wireless device, an IMS message to set up the IMS session over the access network.

2. The method of claim 1, further comprising sending, by the application server to the subscriber server, a request message indicating a first query for the T-ADS information for the IMS session.

3. The method of claim 1, wherein the application server is a service centralization and continuity application server (SCC AS), and the application server performs IMS T-ADS functionality.

4. The method of claim 1, wherein the subscriber server is at least one of:
a home subscriber server; and
a unified data management.

5. The method of claim 1, wherein the first network name is an access point name, and the second network name is a data network name.

6. The method of claim 1, wherein the T-ADS information further comprises an information element indicating whether the first RAT supports an IMS voice over packet-switched session.

7. The method of claim 1, wherein the T-ADS information further comprises an information element indicating whether the second RAT supports an IMS voice over packet-switched session.

8. The method of claim 1, wherein the determining the access network comprises further comprises determining whether the first RAT supports an IMS voice over packet-switched session and/or whether the second RAT supports an IMS voice over packet-switched session.

9. The method of claim 1, further comprising receiving, via the subscriber server from a mobility management entity:
the first network name; and
the first wireless device IP address.

10. The method of claim 1, further comprising receiving, via the subscriber server from an access and mobility management entity:
the second network name; and
the second wireless device IP address.

11. An application server, comprising:
one or more processors; and
memory storing instructions that, when executed by the one or more processors, cause the application server to:
receive, from a subscriber server, terminating access domain selection (T-ADS) information for an Internet protocol multimedia subsystem (IMS) session of a wireless device, wherein the T-ADS information comprises:
a first wireless device Internet protocol (IP) address and a first network name of a first radio access technology (RAT) for the IMS session; and
a second wireless device IP address and a second network name of a second RAT;
determine an access network for the IMS session based on the T-ADS information, wherein the access network is one of the first RAT or the second RAT; and
send, to the wireless device, an IMS message to set up the IMS session over the access network.

12. The application server of claim 11, wherein the instructions, when executed by the one or more processors, further cause the application server to send, to the subscriber server, a request message indicating a first query for the T-ADS information for the IMS session.

13. The application server of claim 11, wherein the application server is a service centralization and continuity application server (SCC AS), and the application server performs IMS T-ADS functionality.

14. The application server of claim 11, wherein the subscriber server is at least one of:
a home subscriber server; and
a unified data management.

15. The application server of claim 11, wherein the first network name is an access point name, and the second network name is a data network name.

16. The application server of claim 11, wherein the T-ADS information further comprises an information element indicating whether the first RAT supports an IMS voice over packet-switched session.

17. The application server of claim 11, wherein the T-ADS information further comprises an information element indicating whether the second RAT supports an IMS voice over packet-switched session.

18. The application server of claim 11, wherein the determination of the access network comprises determining whether the first RAT supports an IMS voice over packet-switched session and/or whether the second RAT supports an IMS voice over packet-switched session.

19. The application server of claim 11, wherein the instructions, when executed by the one or more processors, further cause the application server to receive, via the subscriber server from a mobility management entity:
the first network name; and
the first wireless device IP address.

20. A system comprising:
a subscriber server, comprising:
one or more first processors; and
first memory storing first instructions that, when executed by the one or more first processors, cause the subscriber server to:
send terminating access domain selection (T-ADS) information for an Internet protocol multimedia subsystem (IMS) session of a wireless device, wherein the T-ADS information comprises:

a first wireless device Internet protocol (IP) address and a first network name of a first radio access technology (RAT) for the IMS session; and a second wireless device IP address and a second network name of a second RAT; and an application server, comprising:
  one or more second processors; and
  second memory storing second instructions that, when executed by the one or more second processors, cause the application server to:
    receive the T-ADS information;
    determine an access network for the IMS session based on the T-ADS information, wherein the access network is one of the first RAT or the second RAT; and
    send, to the wireless device, an IMS message to set up the IMS session over the access network.

* * * * *